United States Patent
Watt et al.

(10) Patent No.: US 10,773,564 B2
(45) Date of Patent: Sep. 15, 2020

(54) TENSIONER FOR A SUSPENSION SWING ARM

(71) Applicant: ELECTRAMECCANICA VEHICLES CORP., Vancouver (CA)

(72) Inventors: Daniel Stanley Watt, Surrey (CA); Jerry Kroll, Vancouver (CA); Scott Stuart Hargrove, Tsawwassen (CA); Henry Reisner, North Vancouver (CA); Edward Theobald, Surrey (CA)

(73) Assignee: ELECTRAMECCANICA VEHICLES CORP., Vancouver (CA)

( * ) Notice: Subject to any disclaimer, the term of this patent is extended or adjusted under 35 U.S.C. 154(b) by 153 days.

(21) Appl. No.: 16/081,213

(22) PCT Filed: Mar. 10, 2017

(86) PCT No.: PCT/CA2017/050321
§ 371 (c)(1),
(2) Date: Aug. 30, 2018

(87) PCT Pub. No.: WO2017/152290
PCT Pub. Date: Sep. 14, 2017

(65) Prior Publication Data
US 2019/0092112 A1     Mar. 28, 2019

Related U.S. Application Data

(60) Provisional application No. 62/306,573, filed on Mar. 10, 2016.

(51) Int. Cl.
*B60G 3/14* (2006.01)
*F16H 7/16* (2006.01)
(Continued)

(52) U.S. Cl.
CPC ............... *B60G 3/145* (2013.01); *B60G 7/00* (2013.01); *B60G 9/02* (2013.01); *B60K 17/32* (2013.01);
(Continued)

(58) Field of Classification Search
CPC . B60G 3/145; B60G 3/14; B60G 9/02; B60G 7/00; B60G 2200/322;
(Continued)

(56) References Cited

U.S. PATENT DOCUMENTS 6,446,748 B1    9/2002  Suzuki
7,228,930 B1 *  6/2007  Vey ....................... B62K 13/04
                                                                180/209

(Continued)

FOREIGN PATENT DOCUMENTS

| CA | 2 830 590 | 9/2012 |
| EP | 0 647 798 | 4/1995 |
| WO | 95/34460 | 12/1995 |

OTHER PUBLICATIONS

International Search Report and Written Opinion, dated Jun. 23, 2017, received in International Patent Application No. PCT/CA2017/050321.

(Continued)

*Primary Examiner* — Keith J Frisby
(74) *Attorney, Agent, or Firm* — Davis Wright Tremaine LLP; Heather M. Colburn

(57) ABSTRACT

A swing arm suspension for suspending a rear drive wheel in a three-wheeled electric vehicle has an adjustable arm which allows the tension on the drive belt to be easily adjusted for installing or removing the drive belt or adjusting tension for operation.

13 Claims, 24 Drawing Sheets

(51) Int. Cl.
- *B62K 5/027* (2013.01)
- *B62K 5/05* (2013.01)
- *B60G 7/00* (2006.01)
- *B60K 17/32* (2006.01)
- *B60G 9/02* (2006.01)
- *B60K 7/00* (2006.01)

(52) U.S. Cl.
CPC ........... *F16H 7/16* (2013.01); *B60G 2200/13* (2013.01); *B60G 2200/322* (2013.01); *B60G 2200/422* (2013.01); *B60G 2300/12* (2013.01); *B60G 2300/50* (2013.01); *B60K 2007/0038* (2013.01); *B60K 2007/0061* (2013.01); *B62K 5/027* (2013.01); *B62K 5/05* (2013.01); *B62K 2204/00* (2013.01)

(58) Field of Classification Search
CPC .......... B60G 2200/422; B60G 2200/13; B60G 2300/50; B60G 2300/12; B60G 2300/122; B60G 2300/124; F16H 7/16; B60K 17/32; B60K 2007/0061; B60K 2007/0038; B60K 7/0007; B60K 7/00; B62K 5/027; B62K 5/05; B62K 2005/001; B62K 2204/00; B60Y 2200/12; B60L 2220/46

USPC ....... 180/350, 351, 357, 217, 373, 210, 209, 180/231

See application file for complete search history.

(56) References Cited

U.S. PATENT DOCUMENTS

| | | |
|---|---|---|
| 2002/0063011 A1 | 5/2002 | Montague |
| 2010/0230192 A1 | 9/2010 | Riley |
| 2013/0065721 A1* | 3/2013 | Kluge .................. F16H 57/035 475/149 |
| 2015/0114740 A1 | 4/2015 | Hall et al. |

OTHER PUBLICATIONS

Extended Search Report, dated Oct. 11, 2019, received in European Patent Application No. 17762387.3.

* cited by examiner ers. In the figures, similar elements and/or features may have the same reference label. Further, various elements of# TENSIONER FOR A SUSPENSION SWING ARM

REFERENCE TO RELATED APPLICATIONS

The present application is a U.S. National Stage entry under 35 U.S.C. § 371 of International Application No. PCT/CA2017/050321, filed on Mar. 10, 2017, which claims the benefits, under 35 U.S.C. § 119(e), of U.S. Provisional Application Ser. No. 62/306,573 filed Mar. 10, 2016, entitled "Swingarm," which is incorporated herein by this reference.

BACKGROUND OF THE INVENTION

Field

The present invention relates to swingarm suspensions, and in particular to swingarms deployed in the suspension system of vehicles particularly for supporting one or more rear wheels.

Description of Related Art

Swingarms are conventionally deployed in the suspension system of vehicles, for example motorcycles and all terrain vehicles. It is desirable that they be light yet robust, and easily serviced.

For deployment in electrically powered vehicles, which have innately quiet electric drives in contrast to noisier internal combustion engines, it is also desirable that they operate quietly.

SUMMARY

According to one embodiment there is provided a swing arm suspension for suspending a driven wheel from a vehicle chassis having front and rear ends, the suspension comprising; a rigid arm having a first end pivotally mounted for pivoting about a first horizontal axis transverse to a longitudinal axis of the vehicle on a first axle pivotably supported on the chassis and a second end for adjustably securing to a wheel hub assembly; at least one wheel hub rotatably supported on a second axle rotatably mounted on the wheel hub assembly for securing a wheel thereto for rotation about a second transverse horizontal axis; a first driven pulley mounted on said second axle; an electric motor having a drive shaft and comprising a second drive pulley mounted on the drive shaft; an endless flexible drive belt or chain for transmitting rotational motion from said first drive pulley to said second driven pulley; means on the rigid arm spaced from the first end thereof for securing one end of a shock absorber or spring; wherein the rigid arm is pivotally connected to the wheel hub assembly at two vertically spaced locations, the location of the second one of said locations being adjustable by extending or retracting an elongated adjustment member. According to one embodiment, the vehicle is a three-wheeled electric vehicle and the suspension carries a single rear driven wheel of the three-wheeled vehicle.

DESCRIPTION

The invention will be more fully illustrated by the following detailed description of non-limiting specific embodiments in conjunction with the accompanying drawing figures. In the figures, similar elements and/or features may have the same reference label. Further, various elements of the same type may be distinguished by following the reference label with a second label that distinguishes among the similar elements. If only the first reference label is identified in a particular passage of the detailed description, then that passage describes any one of the similar elements having the same first reference label irrespective of the second reference label.

DETAILED DESCRIPTION OF SPECIFIC EMBODIMENTS

Structure of Specific Embodiments

Figure 1:
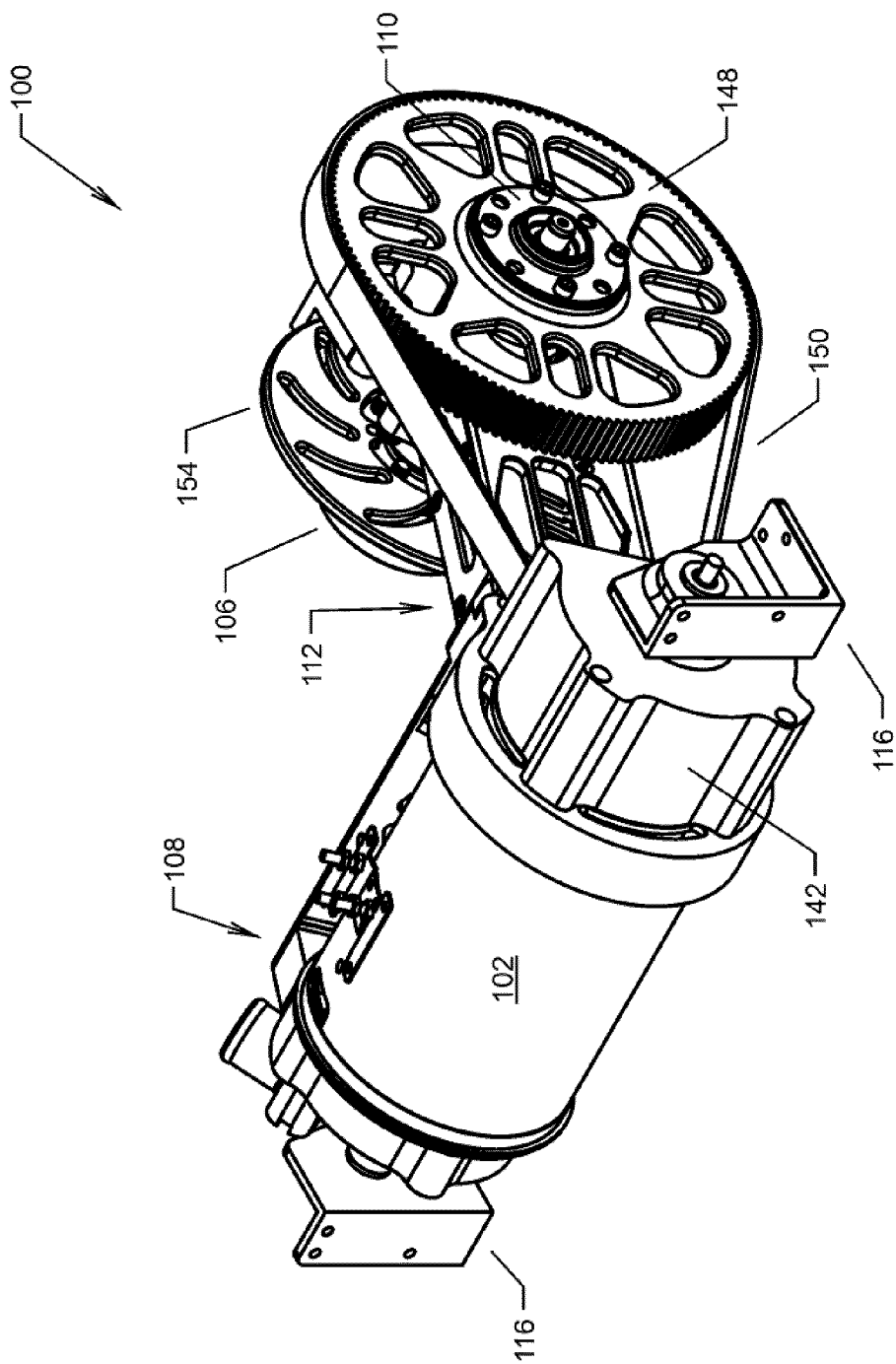
FIG. 1 is a top-front-right isometric view of an embodiment of a swingarm in accordance with aspects of the present invention.
Figure 2:
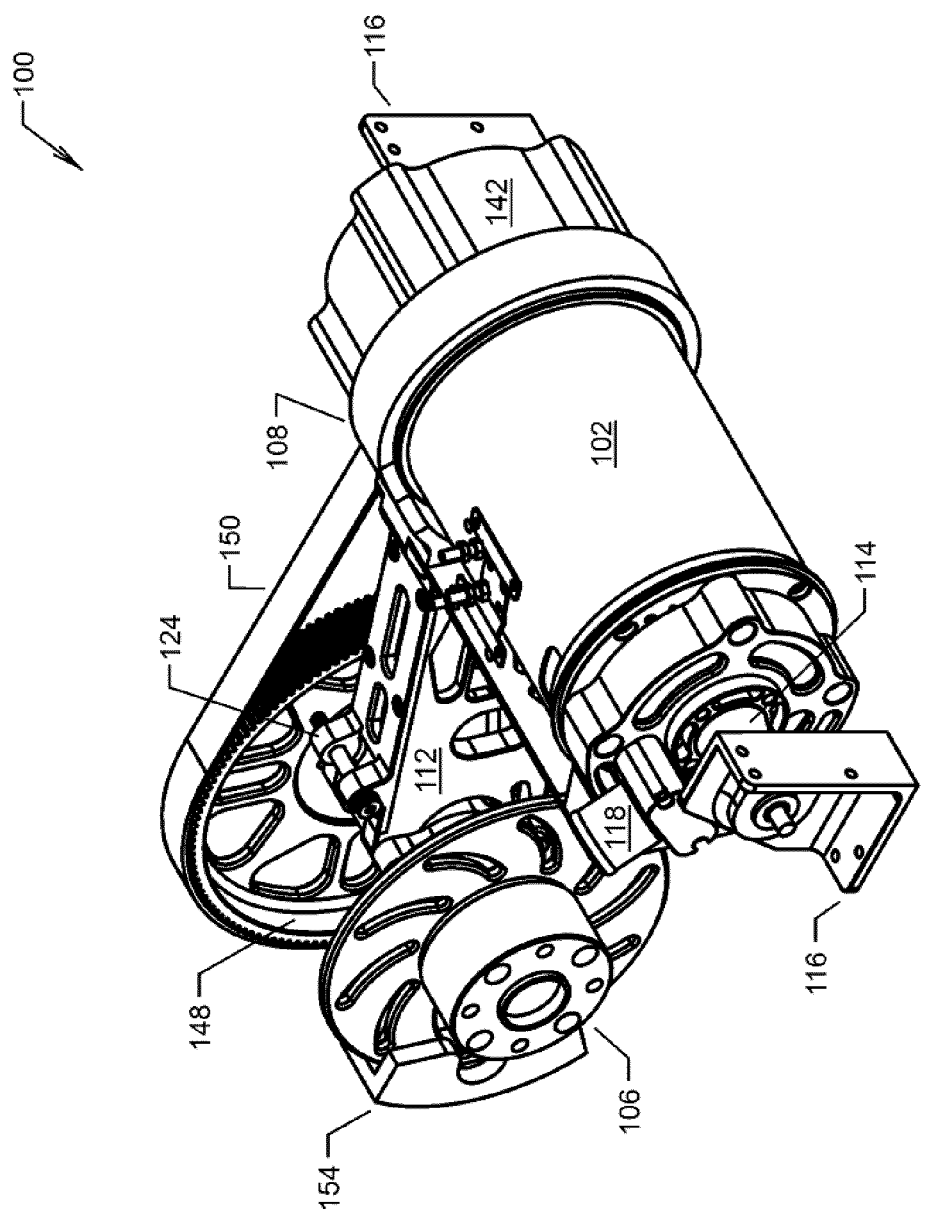
FIG. 2 is a top-front-left isometric view of the swingarm of FIG. 1.
Figure 3:
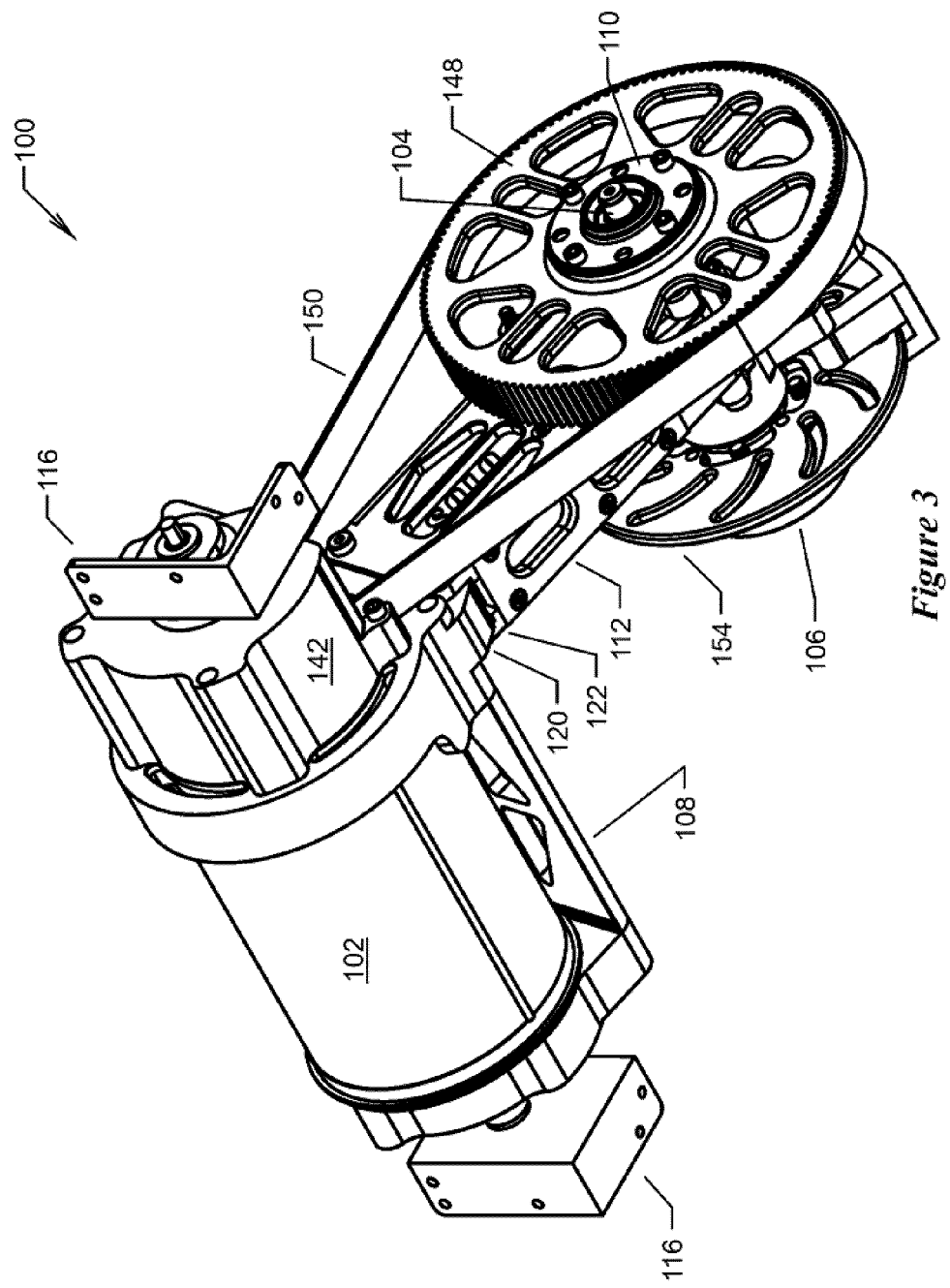
FIG. 3 is a bottom-front-right isometric view of the swingarm of FIG. 1.
Figure 4:
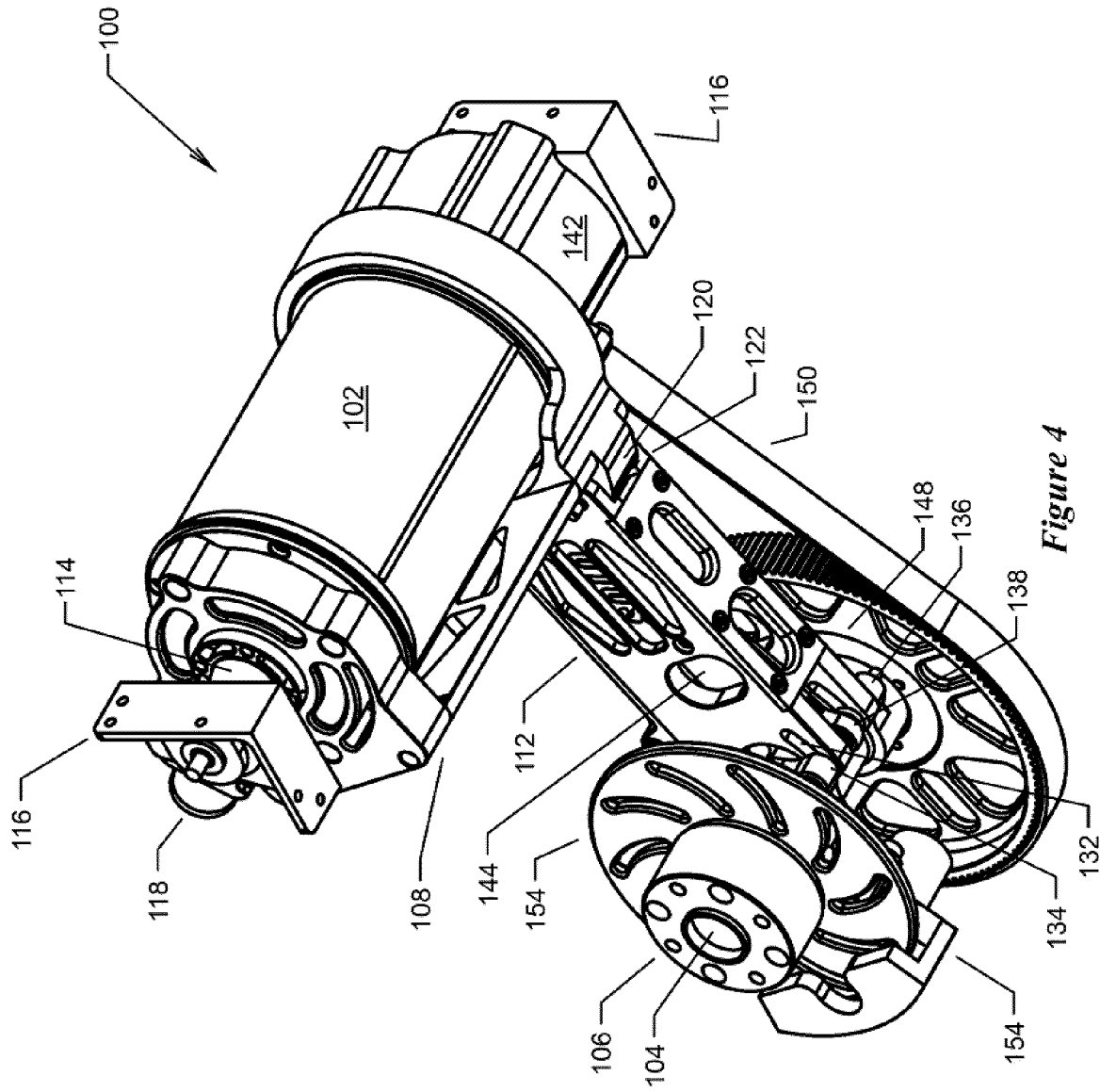
FIG. 4 is a bottom-front-left isometric view of the swingarm of FIG. 1.

The structure of the invention will now be illustrated by explanation of specific, non-limiting, exemplary embodiments shown in the drawing figures and described in greater detail herein.

FIGS. 1-26 show a swingarm 100 according to one embodiment of aspects of the present invention. The swingarm 100 may form part of the suspension system of a vehicle (not shown), including driveably connecting a driving motor 102 to a driven axle 104 supporting a hub 106 for supporting a driven wheel (not shown). The driven wheel may be, for example, the rear wheel of a three-wheeled electric vehicle.

As best seen in FIGS. 1-17, the swingarm 100 may include:
- a frame 108 adapted to fixedly retain the motor 102,
- an axle-housing 110 to house the axle 104 for rotation therewithin and hence rotatably retain the hub 106, and
- a beam 112 to retain the frame 108 and axle-housing 110 (and hence the motor 102 and the hub 106) in a desired spatial relationship.

A pair of bushings 114 may extend from either end of the frame 108 to facilitate rotatably mounting the frame 108 to the vehicle (not shown), for example with a pair of complementary brackets 116.

The frame 108 may further include an air intake 118 to direct cooling air to the motor 102, for example air drawn into the intake 118 by the motion of the motor 102 itself or air otherwise forced into the intake 118.

The frame 108 may include a flange 120 and the beam 112 may include a complementary channel 122 to facilitate rigid attachment of the frame 108 to the beam 112, for example with threaded fasteners.

Figure 18:
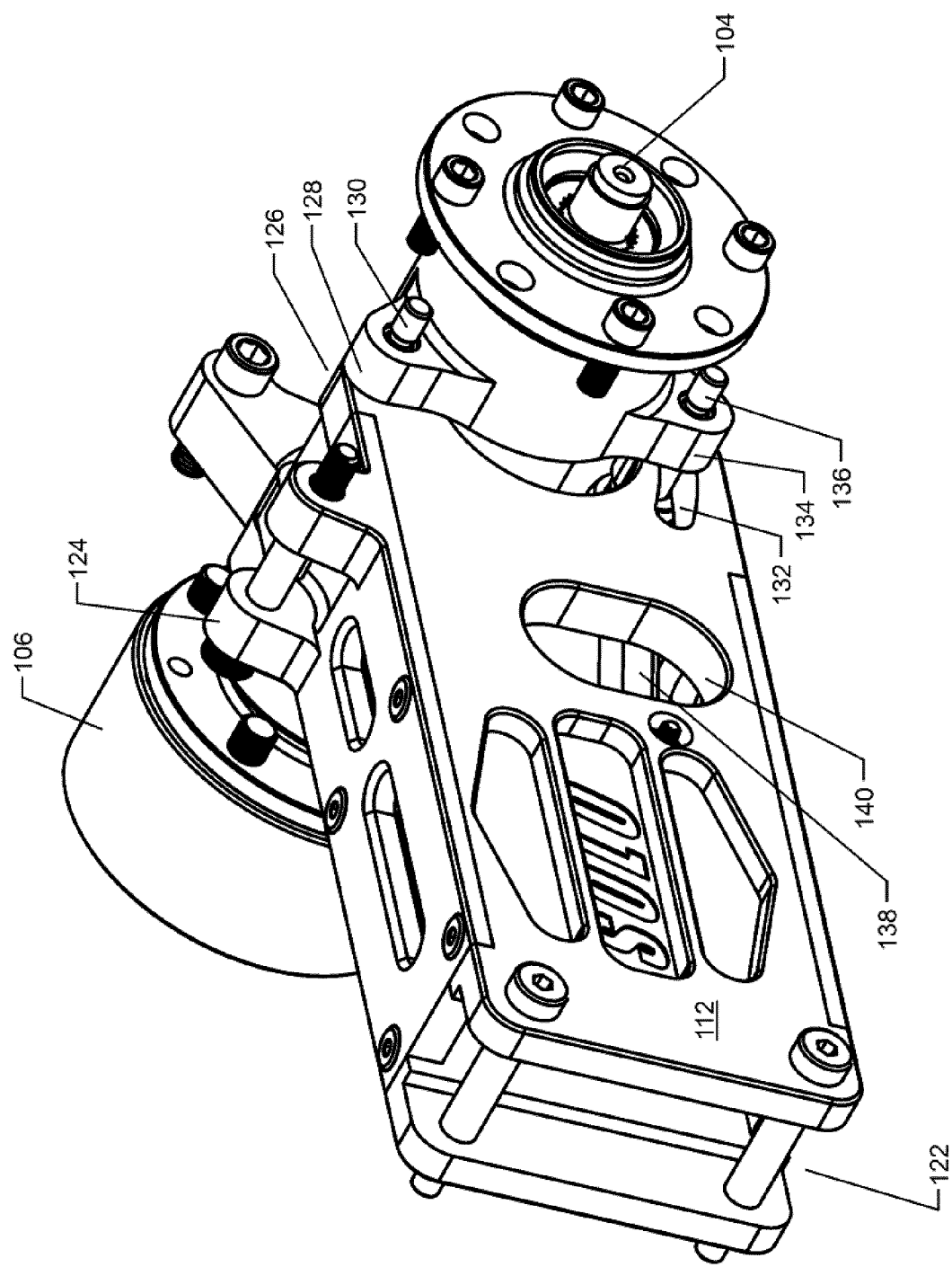
FIG. 18 is a top-front-right isometric view of a beam portion and an axle-housing portion of the swingarm of FIG. 1, with a bull, a belt and brake components hidden for clarity.
Figure 19:
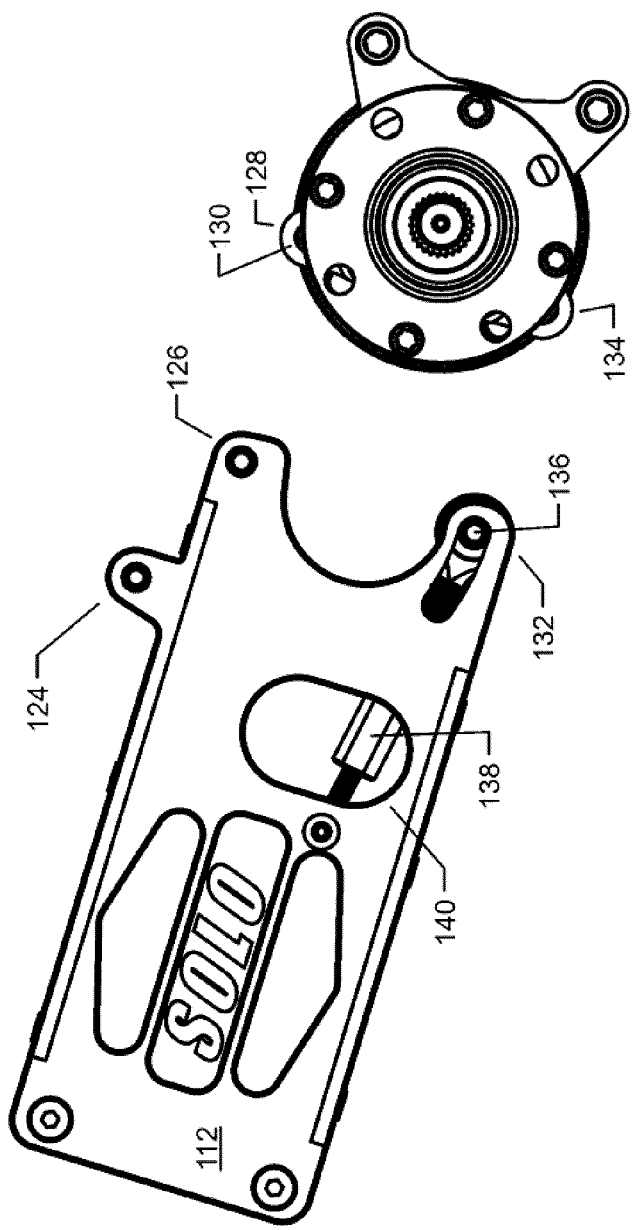
FIG. 19 is a right elevation exploded view of the beam portion and axle-housing portion of FIG. 18.
Figure 20:
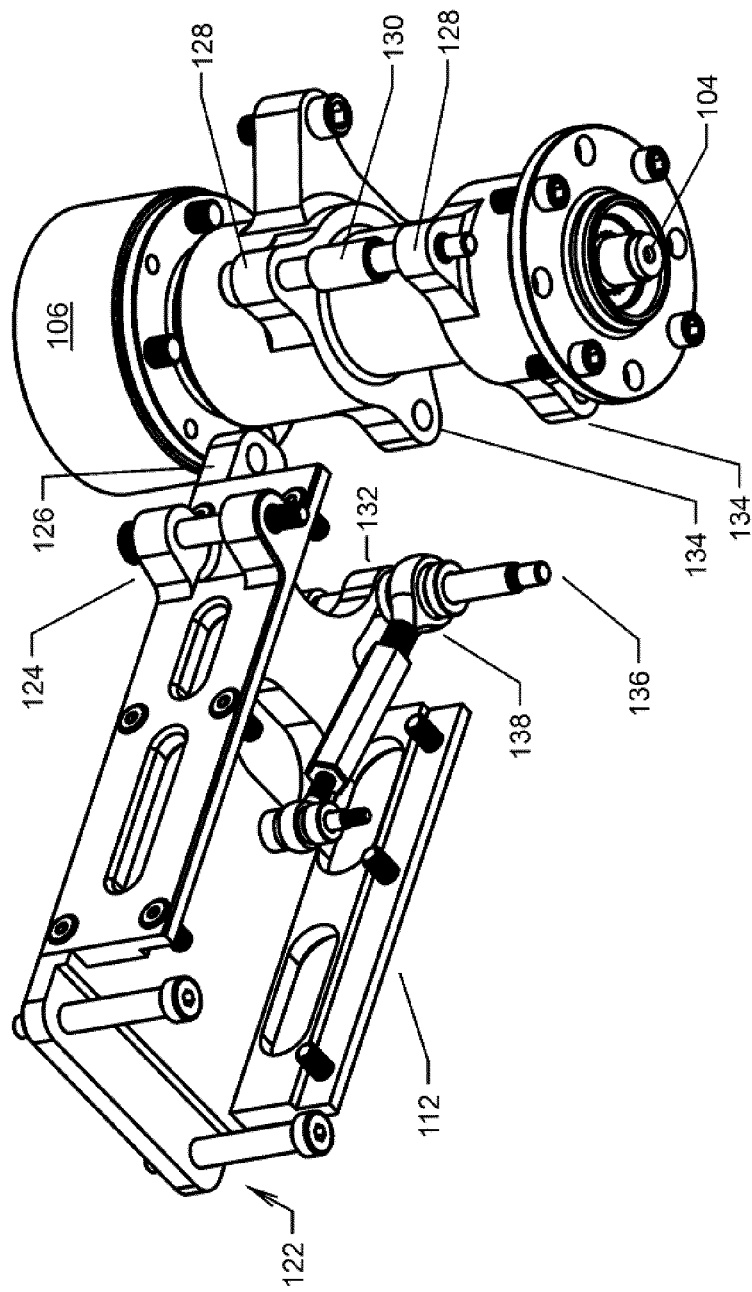
FIG. 20 is a top-front-right isometric exploded view of the beam portion and axle-housing portion of FIG. 19, with a right plate of the beam portion hidden for clarity.
Figure 21:
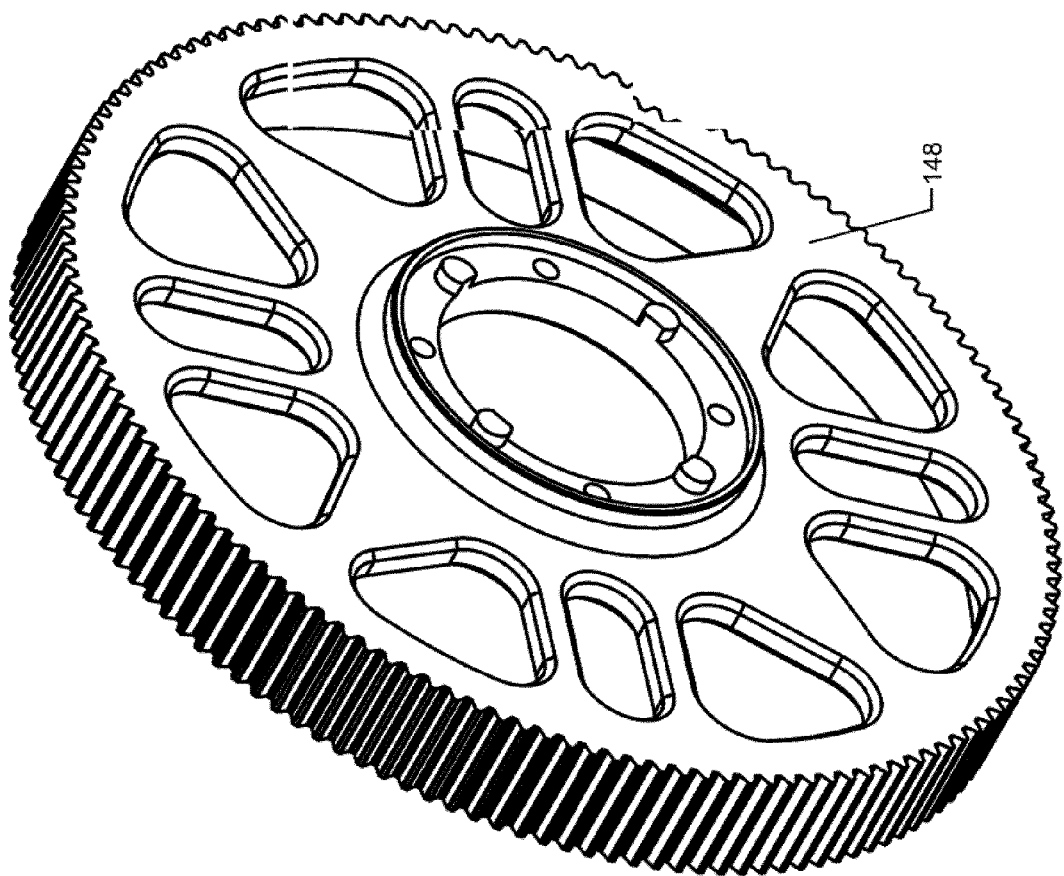
FIG. 21 is a top-front-right isometric view of a pinion and the bull of the swingarm of FIG. 1.
Figure 21:
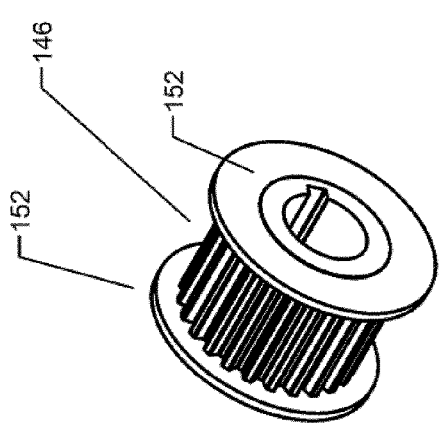
Figure 22:
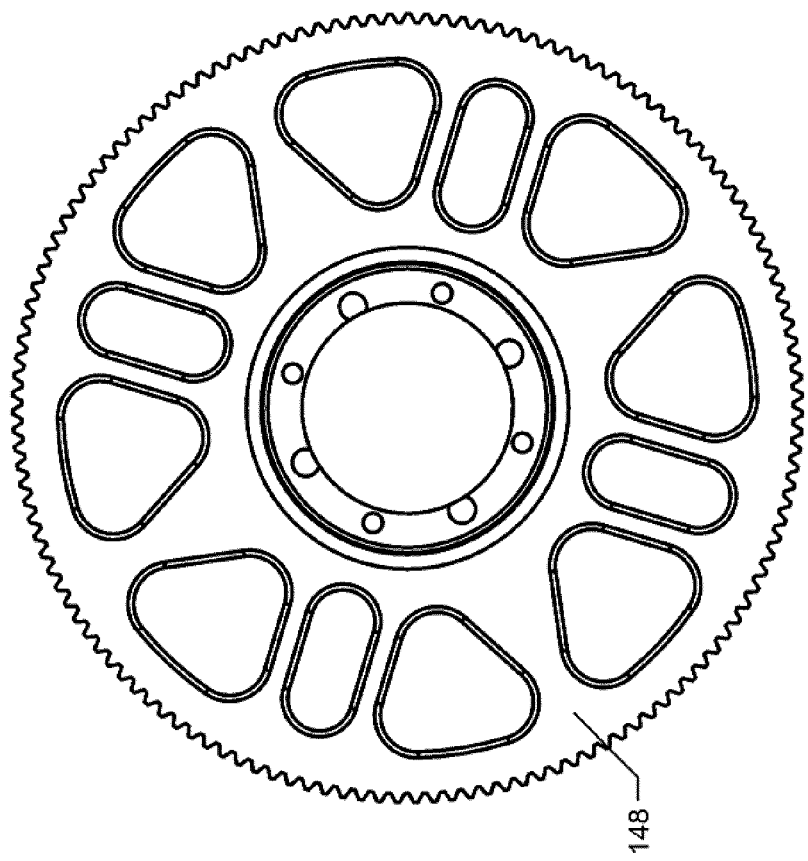
FIG. 22 is a right elevation view of the pinion and bull of FIG. 21, a right guide of the pinion hidden for clarity.
Figure 22:
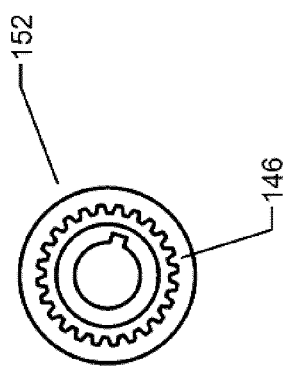
Figure 24:
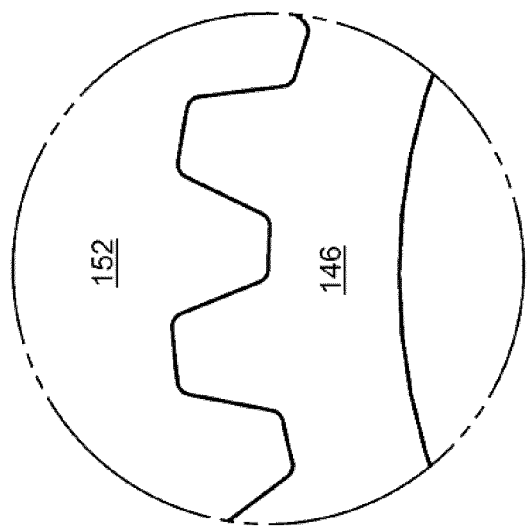
FIG. 24 is a right elevation detail view of teeth of the pinion of FIG. 23.
Figure 23:
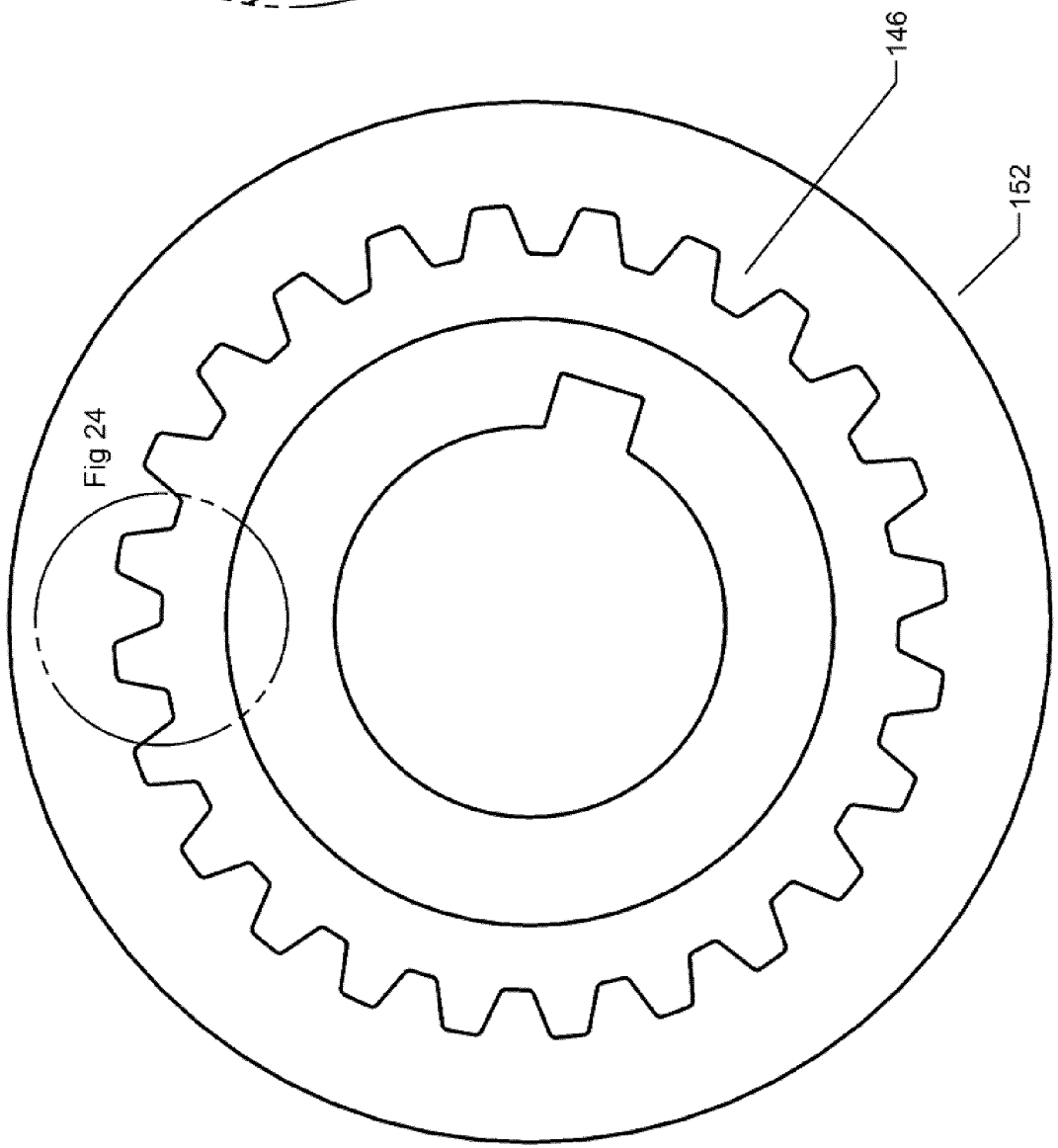
FIG. 23 is a right elevation view of the pinion of FIG. 22.
Figure 26:
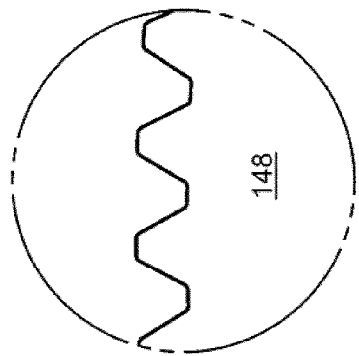
FIG. 26 is a right elevation detail view of teeth of the bull of FIG. 25.
Figure 25:
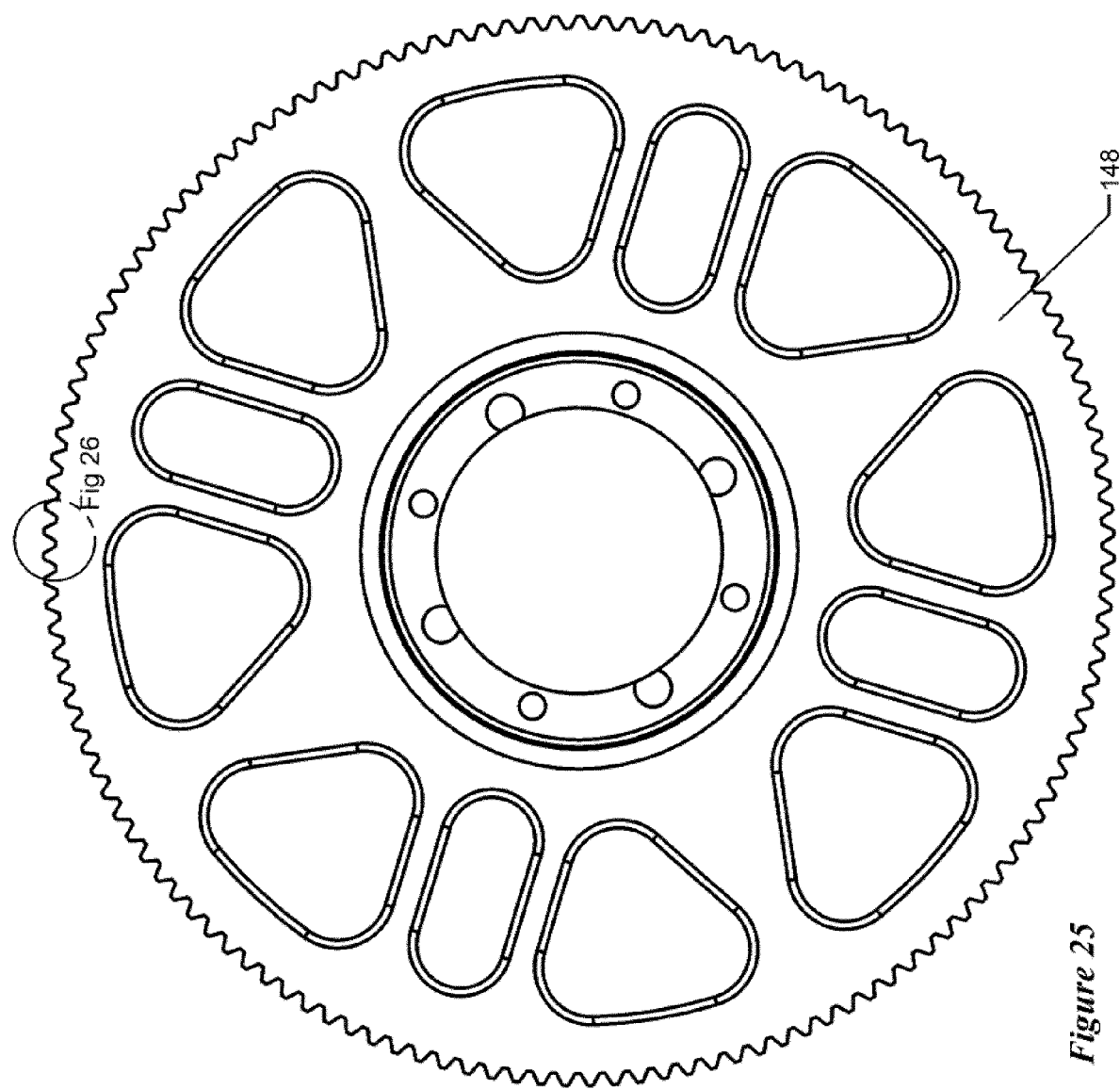
FIG. 25 is a right elevation view of the bull of FIG. 22.

As best seen in FIGS. 18-20, the beam 112 may be formed as a box frame, for example, formed from cast and/or machined aluminum alloy, for example.

The beam 112 may further include a lug 124 for attaching the beam 112 to the vehicle (not shown), for example proximate the axle-housing 110, for example resiliently via a spring (not shown) or other shock absorber (not shown).

The beam 112 and the axle-housing 110 may include a first set of complementary respective knuckles 126, 128 adapted to accept a first pin 130 therethrough for relative rotation thereabout.

The beam 112 and the axle-housing 110 may include a second set of complementary respective knuckles 132, 134 adapted to accept a second pin 136 therethrough for relative rotation thereabout. Those of the second set of complementary knuckles 132 on the beam 112 may be elongated to allow the second pin 136 to also slide therewithin. The beam 112 may further include an adjustable retainer, for example a turnbuckle 138, adapted to retain the second pin 136 in a desired position within those of the second set of complementary knuckles 132 that are elongated and hence to retain the beam 112 and the axle-housing 110 in a desired spatial relationship. In this regard, the beam 112 may include a passage 140 through which to adjust the turnbuckle 138. Those skilled in the art will recognize that alternatively or as well, those of the second set of complementary knuckles 134 that are on the axle-housing 110 may be elongated.

Figure 5:
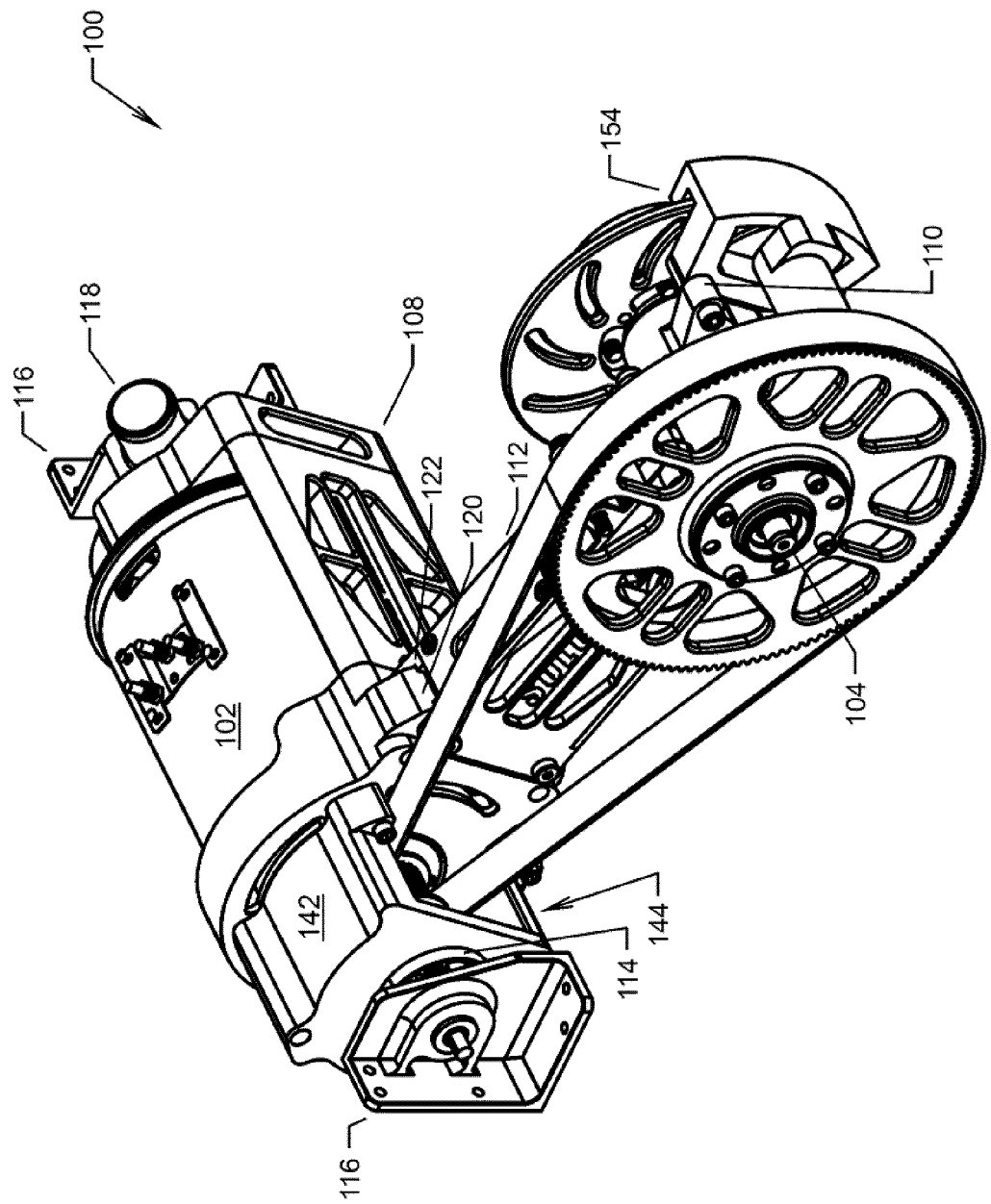
FIG. 5 is a top-rear-right isometric view of the swingarm of FIG. 1.
Figure 6:
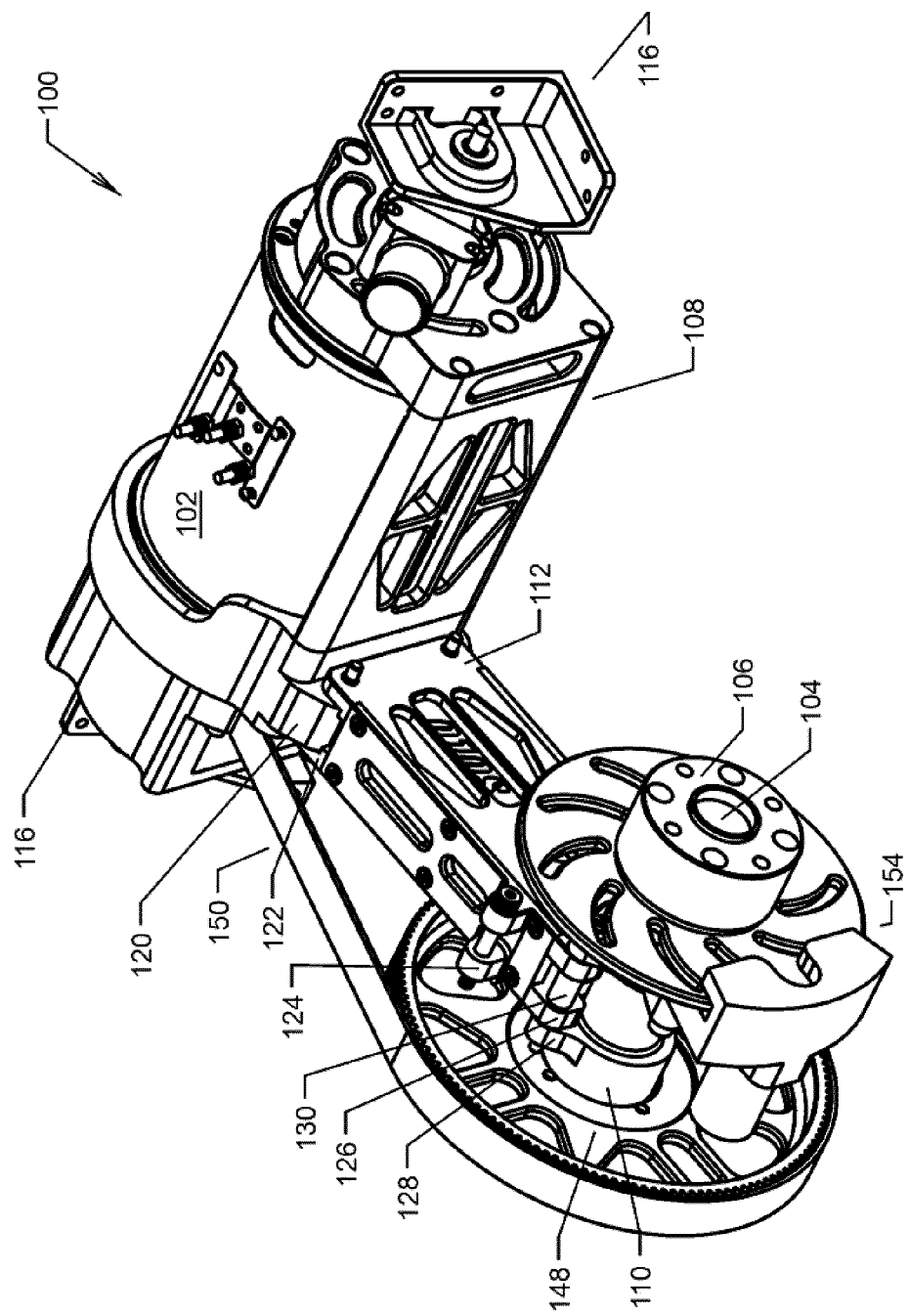
FIG. 6 is a top-rear-left isometric view of the swingarm of FIG. 1.
Figure 7:
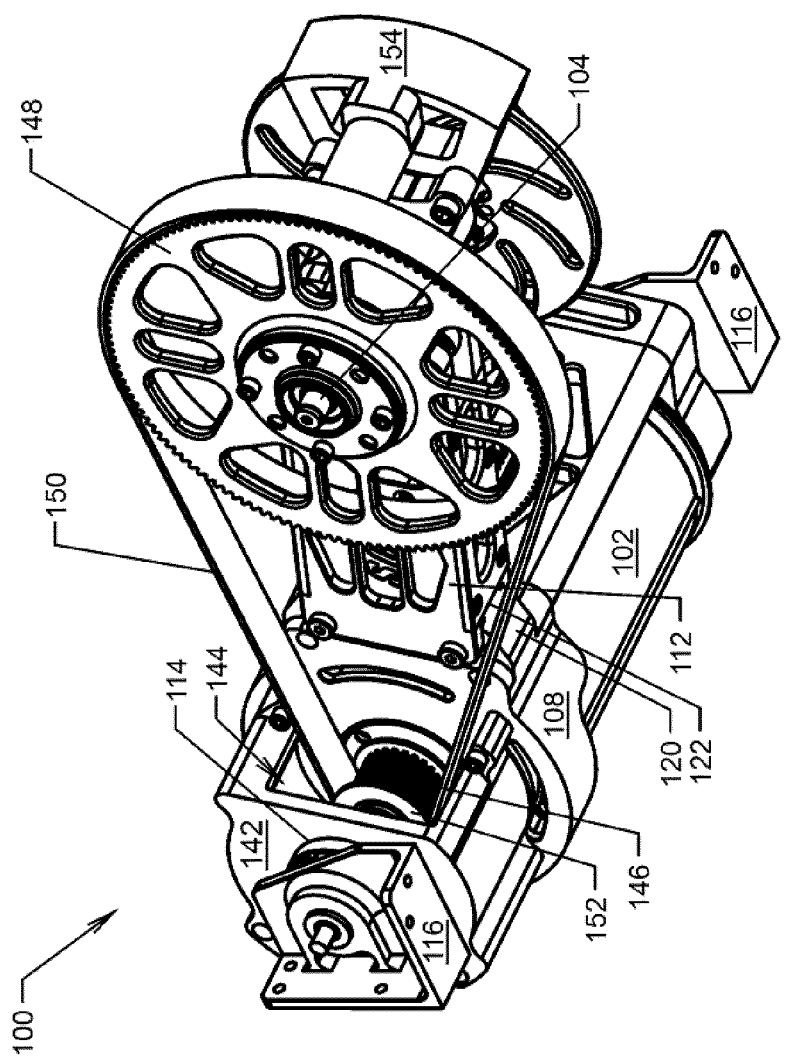
FIG. 7 is a bottom-rear-right isometric view of the swingarm of FIG. 1.
Figure 8:
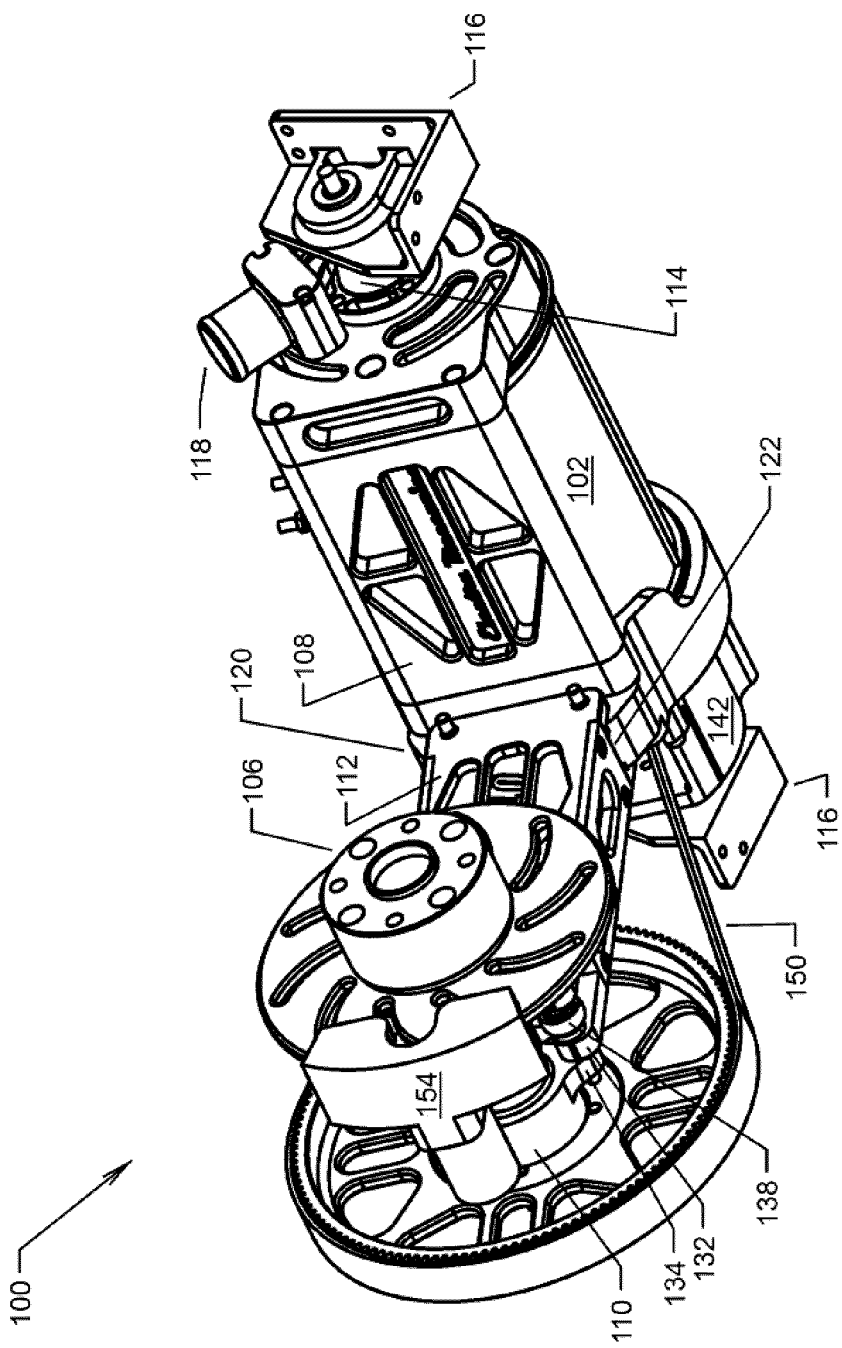
FIG. 8 is a bottom-rear-left isometric view of the swingarm of FIG. 1.
Figure 9:
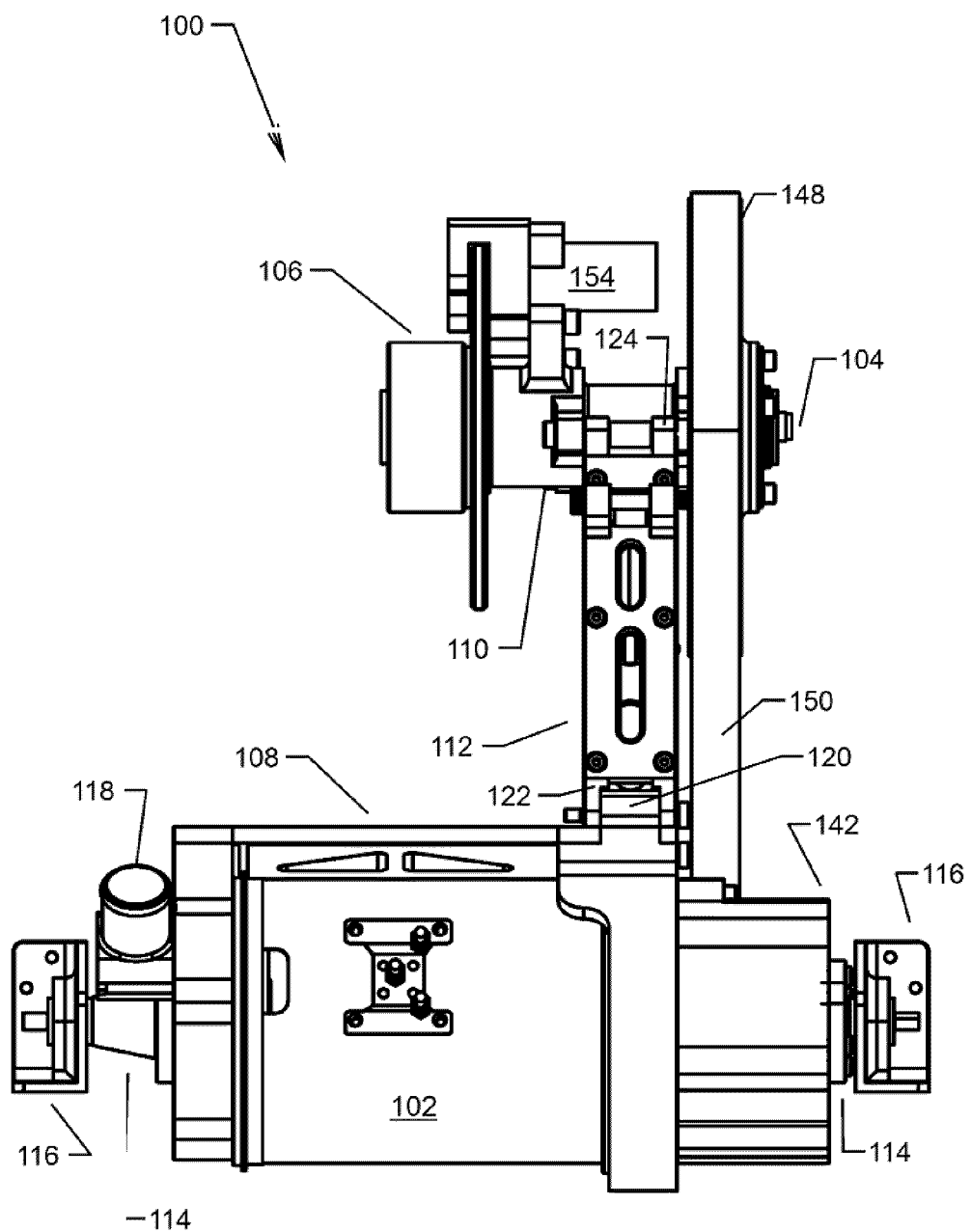
FIG. 9 is a top plan view of the swingarm of FIG. 1.
Figure 10:
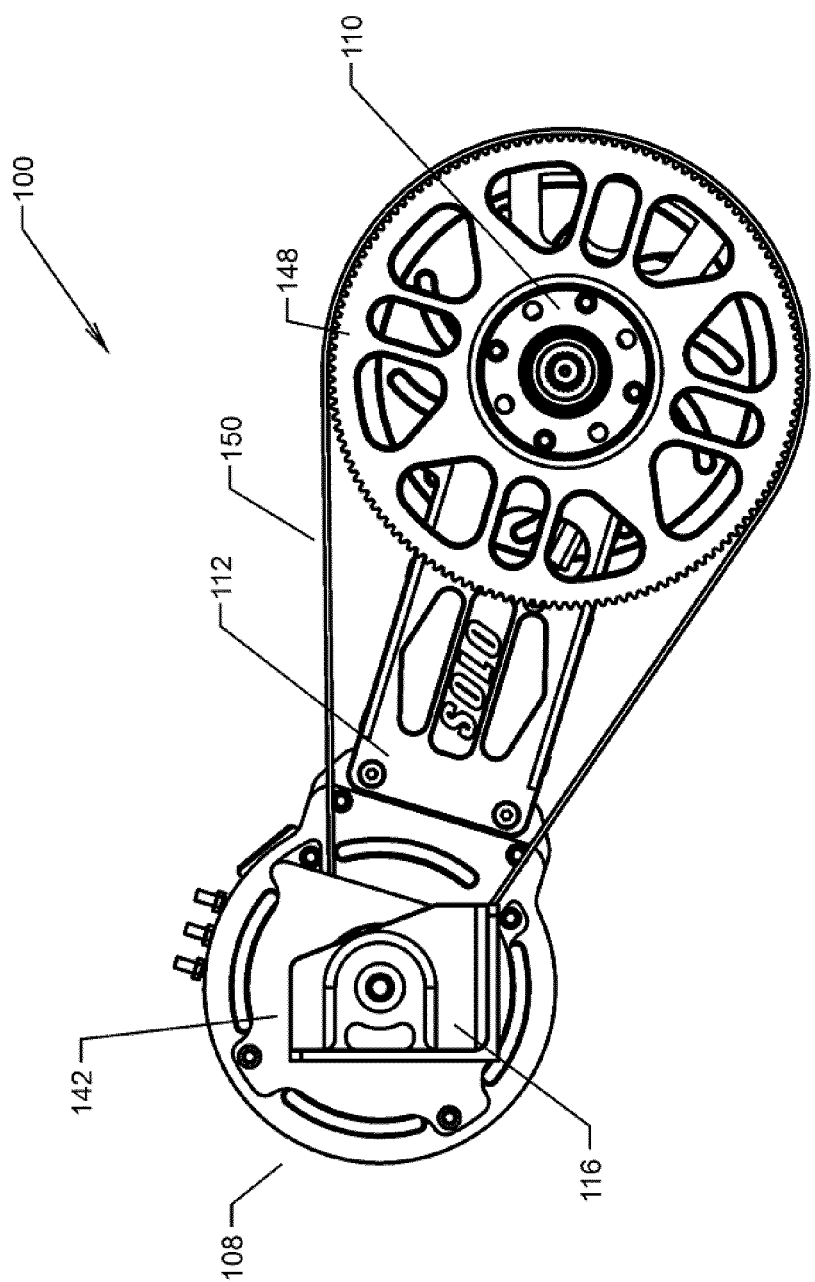
FIG. 10 is a right elevation view of the swingarm of FIG. 1.
Figure 11:
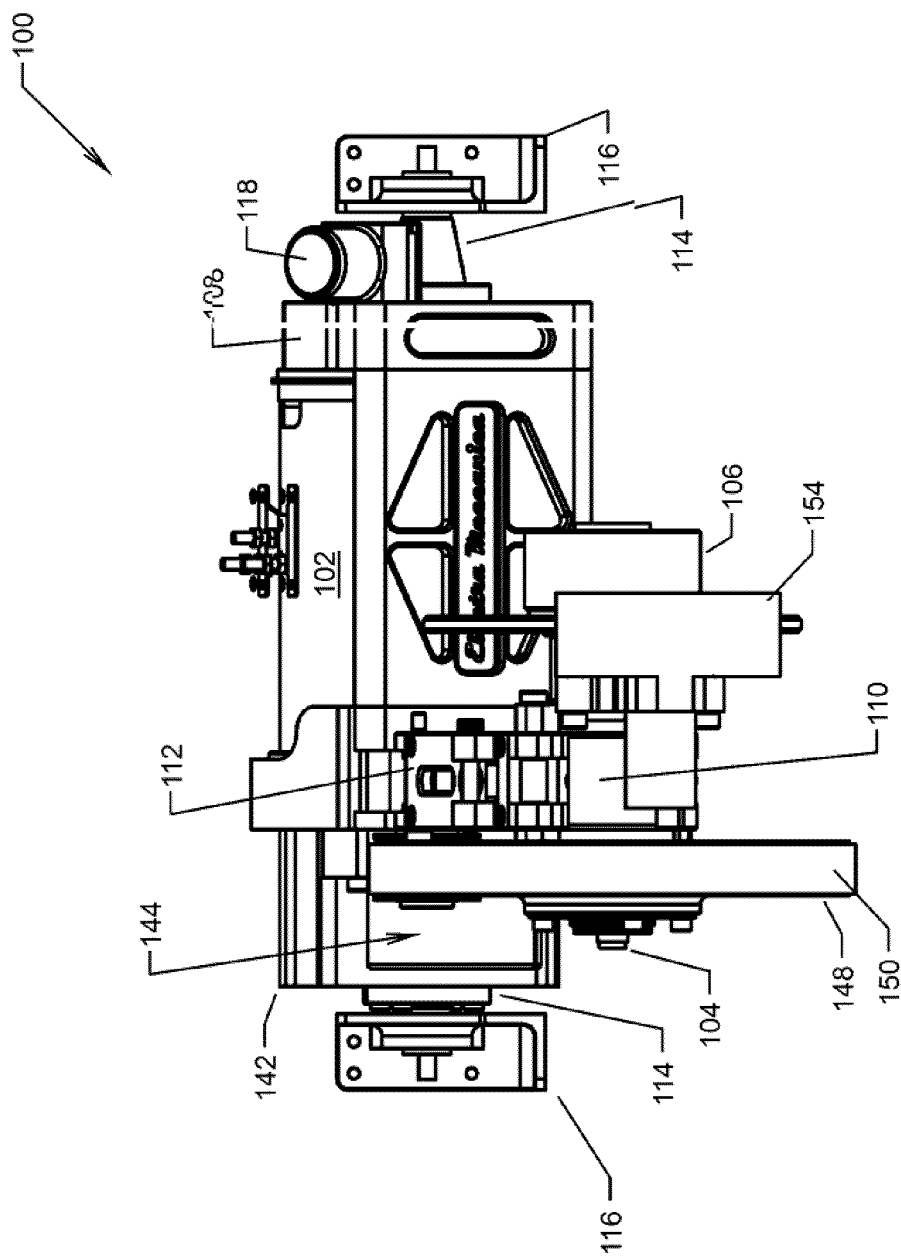
FIG. 11 is a rear elevation view of the swingarm of FIG. 1.
Figure 12:
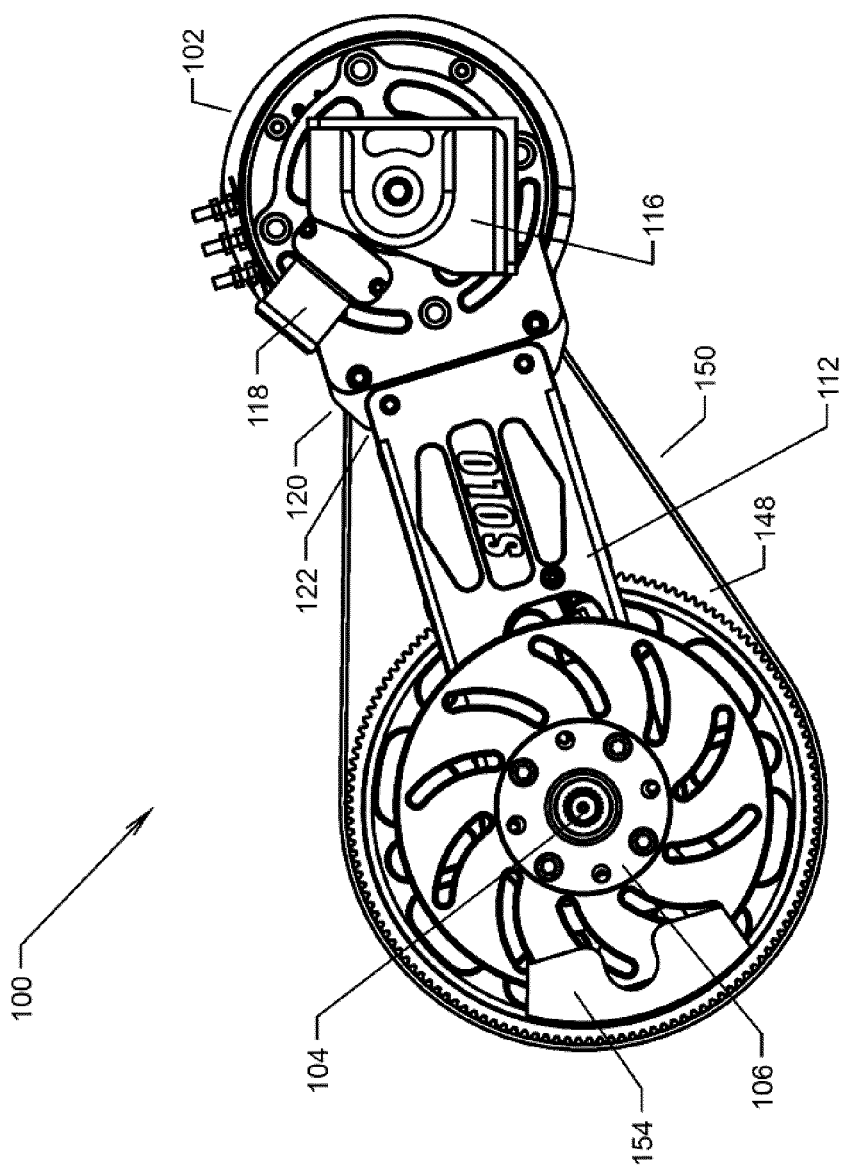
FIG. 12 is a left elevation view of the swingarm of FIG. 1.
Figure 13:
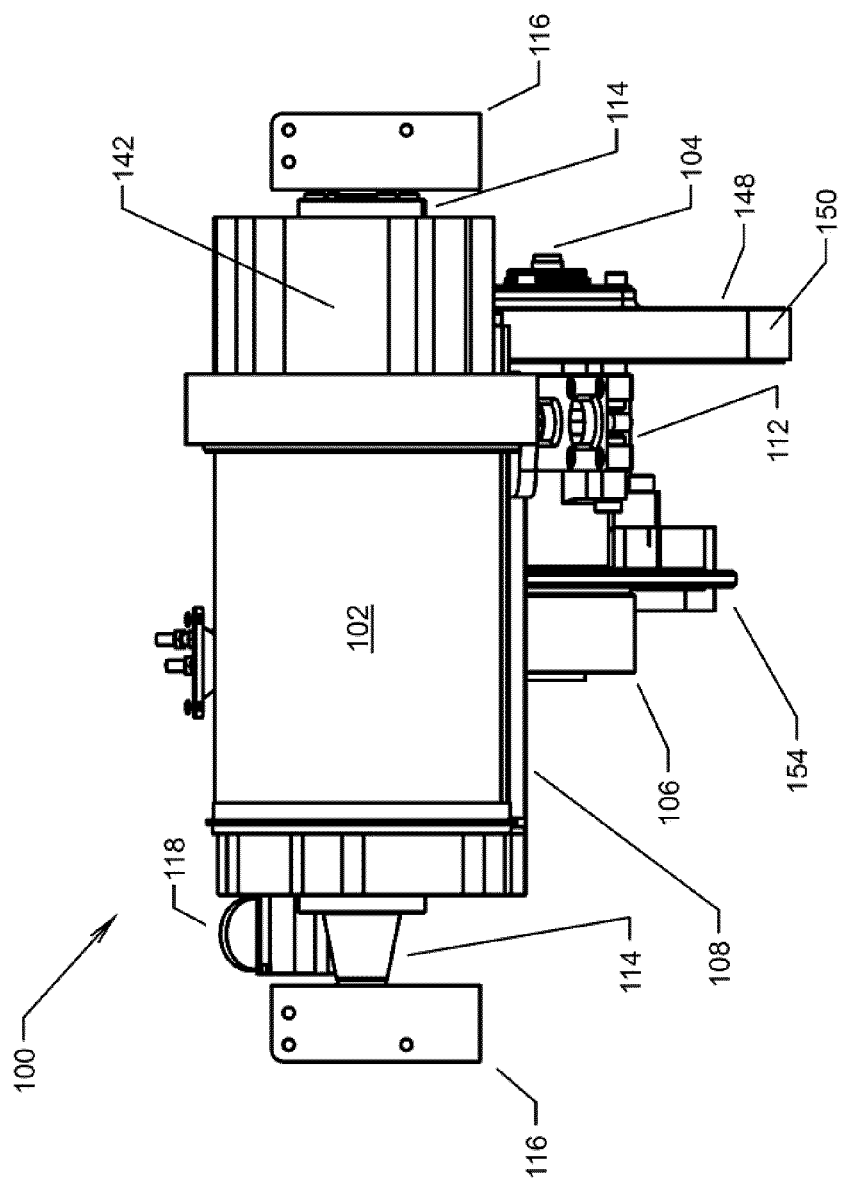
FIG. 13 is a front elevation view of the swingarm of FIG. 1.
Figure 14:
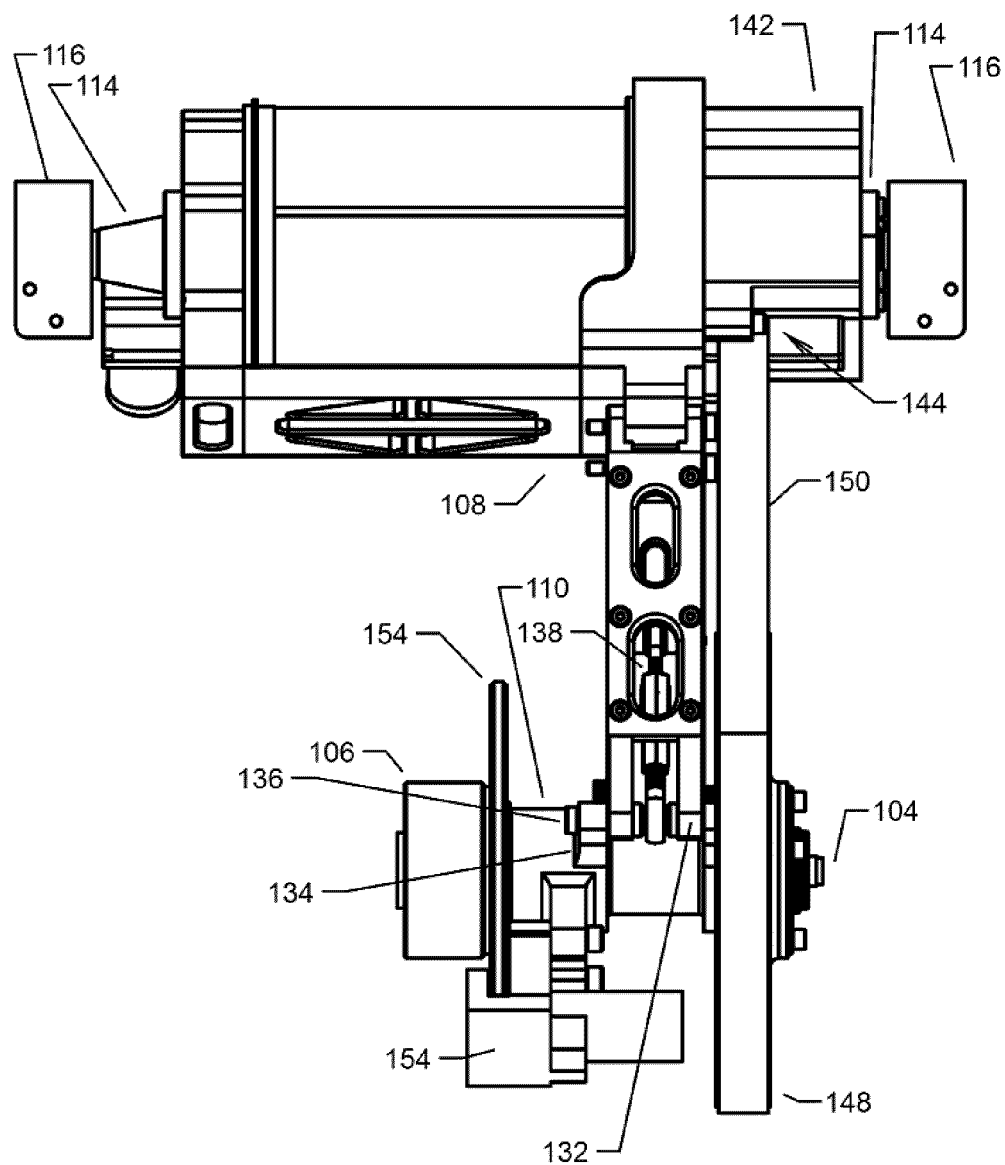
FIG. 14 is a bottom plan view of the swingarm of FIG. 1.
Figure 15:
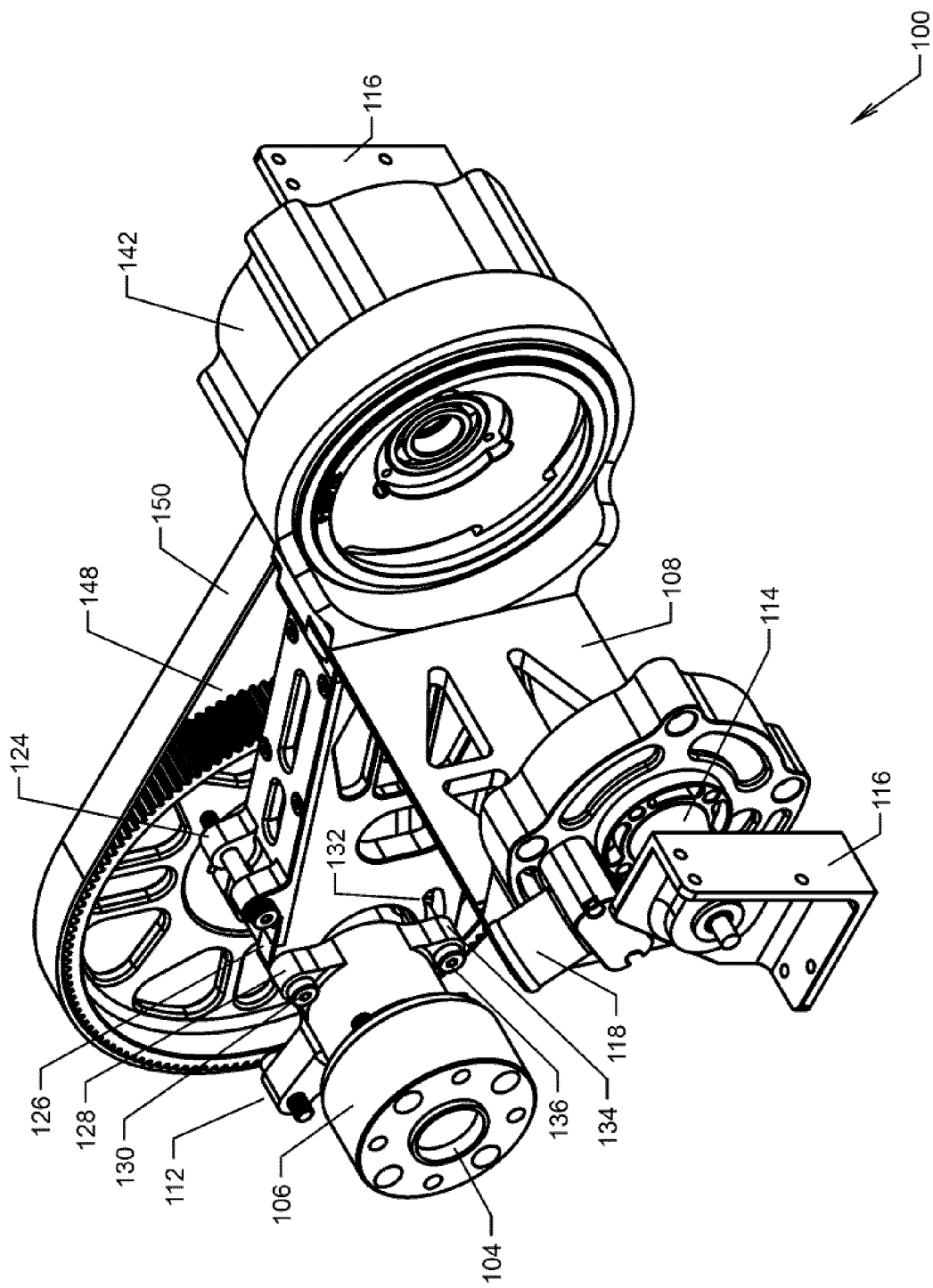
FIG. 15 is a top-front-left isometric view of the swingarm of FIG. 1, with a motor hidden for clarity.
Figure 16:
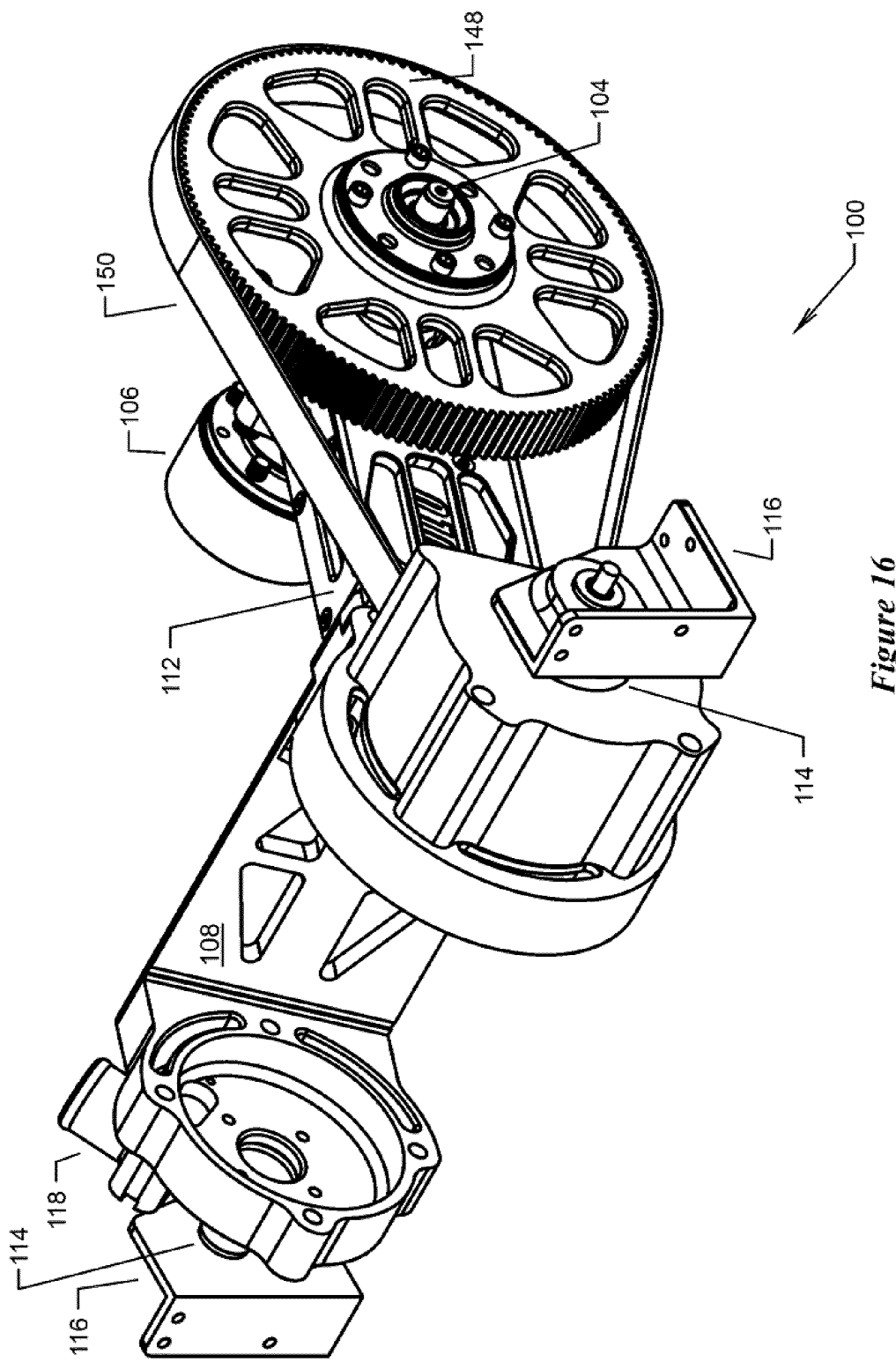
FIG. 16 is a top-front-right isometric view of the swingarm of FIG. 15.
Figure 17:
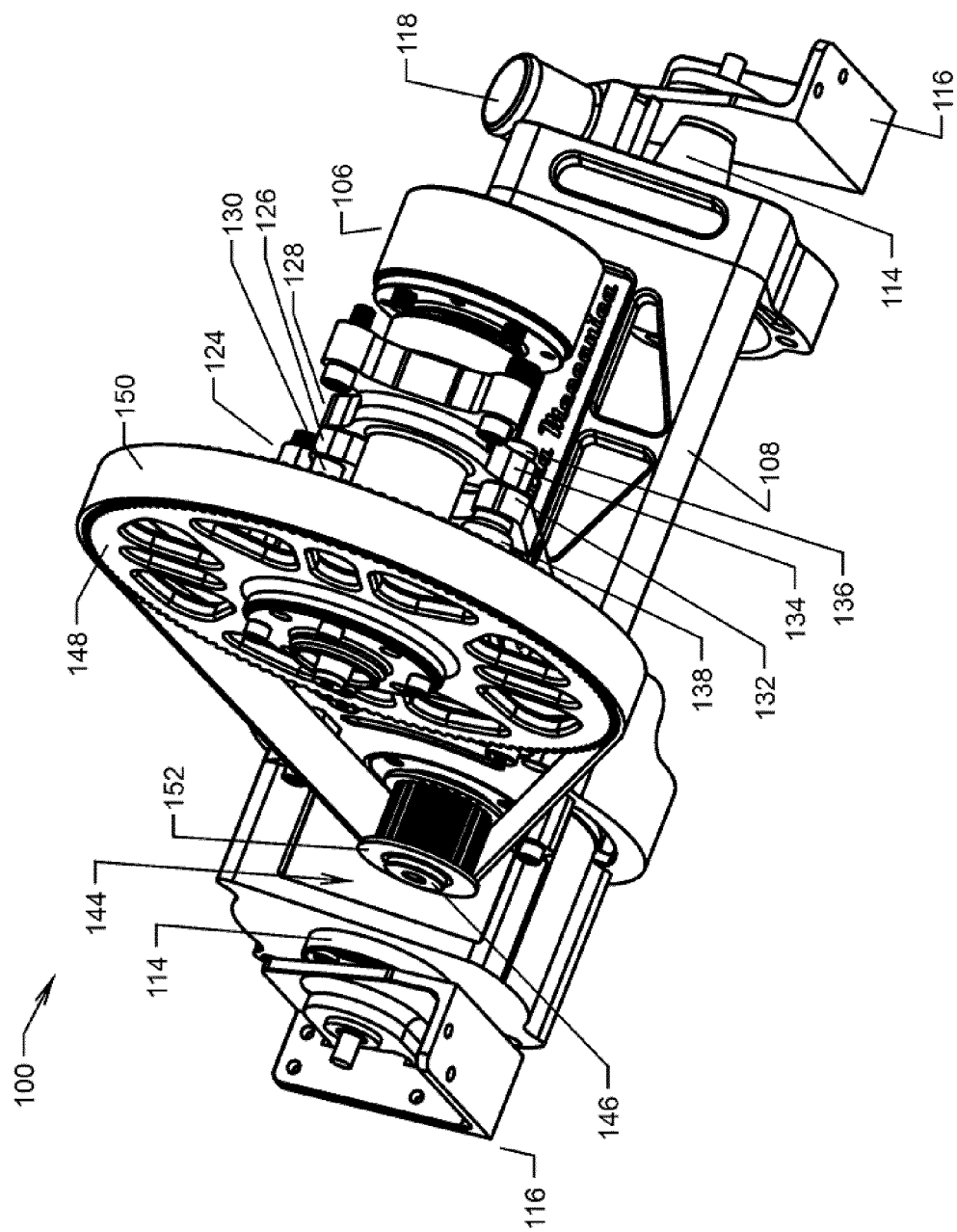
FIG. 17 is a bottom-rear-right isometric view of the swingarm of FIG. 15.

As best seen in FIGS. 5, 7 and 17, the frame 108 may include an endcap 142 portion that includes an access 144. The endcap 142 may house a pinion 146 rotatably connected to the motor 102 to be driven thereby. The axle-housing 110 may include a bull 148 complementary with the pinion 146 and rotatably connected to the axle-housing 110 and engaged with the axle 104 so as to rotate with the axle 104. A belt 150 (or chain or the like), illustrated herein without teeth for simplicity, may couple the pinion 146 with the bull 148 for rotation together, such that the pinion 146 driven by the motor 102 in turn drives the bull 148 and hence the axle 104 and hence the hub 106. The pinion 146 may include one or more guides 152 to urge the belt 150 to remain on the pinion 146. Desirably the width of the access 144 may be greater than the width of the pinion 146 plus the width of the belt 150, such that the belt 150 may be mounted onto or dismounted from the pinion 146 without removing the endcap 142.

The teeth of the pinion 146, the bull 148 and the belt 150 may be configured for low noise, low wear, and efficiency, for example configured as a Gates 8 mm GT2 tooth pattern.

As best seen in FIGS. 1-8, the axle-housing 110 may include or support additional components, for example a brake 154.

Operation of Specific Embodiments

With reference now to FIGS. 1-26, the operation of these specific embodiments of the invention will now be described.

Assembly

The motor 102 may be inserted into the frame 108 and secured in place, for example using threaded fasteners. The frame 108 may be attached to the vehicle (not shown) for relative rotation therewith, at the bushings 114 for example, by the brackets 116 for example, and secured in place using threaded fasteners for example.

The beam 112 may be fastened to the vehicle (not shown) at the lug 124, for example proximate the axle-housing 110, for example resiliently via a spring (not shown) or shock absorber (not shown).

In this regard, the swingarm 100 may swing relative to the underside of the vehicle (not shown), biased by the spring (not shown) or shock absorber (not shown).

The axle 104 may be retained inside the axle-housing 110 for rotation therewithin, and the hub 106 mounted on the axle 104. In this regard, the bull 148 and the axle 104 may be coupled to rotate together, for example in the same direction and at the same angular frequency.

The axle-housing 110 may be attached to the frame 108 via the beam 112. In this regard, the beam 112 may be attached to the frame 108 by inserting the flange 120 into the channel 122 and securing them together, for example with threaded fasteners for a rigid connection.

The axle-housing 110 may be attached to the beam 112 via the first set of complementary respective knuckles 126, 128 and first pin 130, the second set of complementary respective knuckles 132, 134 and second pin 136, and the turnbuckle 138. In this regard, the second set of complementary respective knuckles 132, 134, the second pin 136 and the turnbuckle 138 enable a user to rotate the axle-housing 110 relative to the beam 112 about the first set of complementary respective knuckles 126, 128 and first pin 130, to adjust the distance between the pinion 146 and the bull 148 and hence to adjust the tension of the belt 150 as appropriate for mounting, dismounting and operation.

Servicing

The main servicing of the swingarm 100 involves installation and ongoing tensioning of the belt 150.

To mount or dismount a belt 150, the turnbuckle 138 is shortened (via the passage 140 in the beam 112) to urge the second pin 136 toward the frame 108, and hence draw the second set of complementary knuckles 134 on the axle-housing 110 toward the frame 108, and hence draw the bull 148 toward the pinion 146 so that a slackened belt 150 can be mounted or dismounted from the bull 148. The belt 150 can be mounted onto or dismounted from the pinion 146 over the guide 152 through the access 144 in the endcap 142. With the belt 150 mounted, the turnbuckle 138 is lengthened (via the passage 140 in the beam 112) to urge the second pin 136 away from the frame 108, and hence urge the second set of complementary knuckles 134 on the axle-housing 110 away from the frame 108, and urge the bull 148 away from the pinion 146 so as to tighten the belt 150. Advantageously, this servicing can be completed without removing the endcap 142, the pinion 146 or the bull 148, or any parts other than the belt 150, if needed.

Operation

In use, a driver wishing to drive the vehicle (not shown) would energize the motor 102, causing the pinion 146 to rotate. The belt 150 would transfer the rotational movement of the pinion 146 to the bull 148, causing the bull 148 to rotate, typically at an angular frequency lower than that of the pinion 146. The rotating bull 148 would similarly cause the axle 104 and hence the hub 106 to rotate.

Should the driver wish to drive the vehicle in the opposite direction, he would energize the motor 102 to cause the pinion 146 to rotate in the opposite direction.

Should the driver wish to stop the vehicle, he might apply the brake 154 and/or energize the motor 102 to urge the pinion 146 to stop rotating, including applying regenerative braking.

While the vehicle (not shown) drives along a surface, for example a road, the spring (not shown) or other shock absorber (not shown) attaching the beam 112 at the lug 124 to the vehicle (not shown) resiliently urges the wheel (not shown) on the hub 106 toward the surface for traction, the swing arm 100 pivoting on the bushings 114 at the brackets 116.

Description Summary

Thus, it will be seen from the foregoing embodiments and examples that there has been described a way to suspend a wheel from a vehicle and drive the wheel with a motor.

While specific embodiments of the invention have been described and illustrated, such embodiments should be considered illustrative of the invention only and not as limiting the invention. In particular, all quantities described have been determined empirically and those skilled in the art might well expect a wide range of values surrounding those described to provide similarly beneficial results.

It will be understood by those skilled in the art that various changes, modifications and substitutions can be made to the foregoing embodiments without departing from the principle and scope of the invention expressed in the claims made herein.

While the invention has been described as having particular application for vehicles, those skilled in the art will recognize it has wider application.

The invention claimed is:

1. A swing arm suspension for suspending a driven wheel from a chassis of a vehicle, said chassis having front and rear ends, said suspension comprising:
   a. a rigid arm having a first end pivotally mounted for pivoting about a first horizontal axis transverse to a longitudinal axis of the vehicle on a first axle pivotably supported on said chassis and a second end for adjustably securing to a wheel hub assembly;
   b. at least one wheel hub rotatably supported on a second axle rotatably mounted on said wheel hub assembly for securing a wheel thereto for rotation about a second transverse horizontal axis;
   c. a first driven pulley mounted on said second axle;
   d. an electric motor having a drive shaft and comprising a second drive pulley mounted on said drive shaft;
   e. an endless flexible drive belt or chain for transmitting rotational motion from said second drive pulley to said first driven pulley;
   f. means on said rigid arm spaced from said first end thereof for securing one end of a shock absorber or spring; and
   g. an access to the second drive pulley, said access having a width that is greater than a combined width of said second drive pulley and said endless flexible drive belt or chain;
   h. wherein said rigid arm is pivotally connected to said wheel hub assembly at two vertically spaced locations, a location of a second one of said vertically spaced locations being adjustable by extending or retracting an elongated selectively adjustable adjustment member;
   whereby a tension of said endless flexible drive belt or chain can be increased or decreased by extending or retracting said adjustment member, and whereby said endless flexible drive belt or chain may be mounted onto or removed from said second drive pulley via the access without a need to remove any parts of said suspension when mounting or removing said endless flexible drive belt or chain.

2. The swing arm suspension of claim 1 wherein said rigid arm comprises a box frame.

3. The swing arm suspension of claim 1 wherein said adjustment member is pivotably secured to said rigid arm at the first end thereof and pivotally secured to said wheel hub assembly at the second end thereof.

4. The swing arm suspension of claim 3 wherein said second end of said adjustment member comprises a pin extending transversely to said longitudinal axis of said vehicle and mounted for slidable movement in a guide slot on said rigid arm.

5. The swing arm suspension of claim 1 wherein said vehicle is a three-wheeled vehicle and said suspension carries a single rear driven wheel of said three-wheeled vehicle.

6. The swing arm suspension of claim 1 wherein only one wheel is carried on said rigid arm to provide a three-wheeled vehicle.

7. The swing arm suspension of claim 1 wherein said rigid arm at said one of said vertically spaced locations comprises a first aperture for receiving a first pin to extend through said first aperture and into a corresponding complementary second aperture in said wheel hub assembly.

8. The swing arm suspension of claim 7 wherein said second vertically spaced location comprises third and fourth complementary apertures in said rigid arm and said wheel hub assembly and a second pin means for extending through said third and fourth complementary apertures, and wherein said adjustment member enables a user to rotate the wheel hub assembly relative to said rigid arm about said first pin to adjust a distance between the drive and driven pulleys and thereby to adjust the tension of the endless flexible drive belt or chain for mounting and dismounting said endless flexible drive belt or chain, or operation of said vehicle.

9. The swing arm suspension of claim 1 wherein said adjustment member is a turnbuckle.

10. The swing arm suspension of claim 1 wherein said adjustment member is selectively tightened or loosened to secure said adjustment member at a selected length or adjust said adjustment member to a different length.

11. A three-wheeled electric vehicle comprising:
a swing arm suspension for suspending a driven wheel from a vehicle chassis having front and rear ends, said suspension comprising (a) a rigid arm having a first end pivotally mounted for pivoting about a first horizontal axis transverse to a longitudinal axis of the three-wheeled electric vehicle on a first axle pivotably supported on said vehicle chassis and a second end for adjustably securing to a wheel hub assembly, (b) at least one wheel hub rotatably supported on a second axle rotatably mounted on said wheel hub assembly for securing a wheel thereto for rotation about a second transverse horizontal axis, (c) a first driven pulley mounted on said second axle, (d) an electric motor having a drive shaft and comprising a second drive pulley mounted on said drive shaft, (e) an endless flexible drive belt or chain for transmitting rotational motion from said second drive pulley to said first driven pulley, (f) means on said rigid arm space from said first end thereof for securing one end of a shock absorber or spring, and (g) an access to the second drive pulley, said access having a width that is greater than a combined width of said second drive pulley and said endless flexible drive belt or chain, wherein said rigid arm is pivotally connected to said wheel hub assembly at two vertically spaced locations, a location of a second one of said vertically spaced locations being adjustable by extending or retracting an elongated selectively adjustable adjustment member, whereby a tension of said endless flexible drive belt or chain can be increased or decreased by extending or retracting said adjustment member, and whereby said endless flexible drive belt or chain may be mounted onto or removed from said second drive pulley via the access without a need to remove any parts of said suspension when mounting or removing said endless flexible drive belt or chain; and
a driven wheel mounted on said wheel hub assembly.

12. A method of removing a drive belt or chain from a swing arm suspension for suspending a driven wheel from a chassis of a vehicle, the chassis having front and rear ends, said suspension comprising (a) a rigid arm having a first end pivotally mounted for pivoting about a first horizontal axis transverse to a longitudinal axis of the vehicle on a first axle pivotably supported on said chassis and a second end for adjustably securing to a wheel hub assembly, (b) at least one wheel hub rotatably supported on a second axle rotatably mounted on said wheel hub assembly for securing a wheel thereto for rotation about a second transverse horizontal axis, (c) a first driven pullet mounted on said second axle, (d) an electric motor having a drive shaft and comprising a second drive pulley mounted on said drive shaft, (e) an endless flexible drive belt or chain for transmitting rotational motion from said second drive pulley to said first driven pulley, (f) means on said rigid arm spaced from said first end thereof for securing one end of a shock absorber or spring, and (g) an access to the second drive pulley, said access having a width that is greater than a combined width of said second drive pulley and said endless flexible drive belt or chain, wherein said rigid arm is pivotally connected to said wheel hub assembly at two vertically space locations, a location of a second one of said vertically spaced locations being adjustable by extending or retracting an elongated selectively adjustable adjustment member, whereby a tension of said endless flexible drive belt or chain can be increased or decreased by extending or retracting said adjustment member, and whereby said endless flexible drive belt or chain may be mounted onto or removed from said second drive pulley via the access without a need to remove any parts of said suspension when mounting or removing said endless flexible drive belt or chain, the method comprising the steps of:
loosening said adjustment member,
rotating said wheel hub assembly towards said rigid arm thereby reducing the tension on said endless flexible drive belt or chain, and
then removing said endless flexible drive belt or chain from said second drive pulley via the access.

13. A method of installing a drive belt or chain onto a swing arm suspension for suspending a driven wheel from a chassis of a vehicle, the chassis having front and rear ends, said suspension comprising (a) a rigid arm having a first end pivotally mounted for pivoting about a first horizontal axis transverse to a longitudinal axis of the vehicle on a first axle pivotably supported on said chassis and a second end for adjustably securing to a wheel hub assembly, (b) at least one wheel hub rotatably supported on a second axle rotatably mounted on said wheel hub assembly for securing a wheel thereto for rotation about a second transverse horizontal axis, (c) a first driven pulley mounted on said second axle, (d) an electric motor having a drive shaft and comprising a second drive pulley mounted on said drive shaft, (e) an endless flexible drive belt or chain for transmitting rotational motion from said second drive pulley to said first driven pulley, (f) means on said rigid arm spaced from said first end thereof for securing one end of a shock absorber or spring, and (g) an access to the second drive pulley, said access having a width that is greater than a combined width of said second drive pulley and said endless flexible drive belt or chain, wherein said rigid arm is pivotally connected to said wheel hub assembly at two vertically spaced locations, a location of a second one of said vertically spaced locations being adjustable by extending or retracting an elongated selectively adjustable adjustment member, whereby a tension of said endless flexible drive belt or chain can be increased or decreased by extending or retracting said adjustment member, and whereby said endless flexible drive belt or chain may be mounted onto or removed from said second drive pulley via the access without a need to remove any parts of said suspension when mounting or removing said endless flexible drive belt or chain, the method comprising the steps of:
loosening said adjustment member,
rotating said wheel hub assembly towards said rigid arm,
installing said endless flexible drive belt or chain on said second drive pulley via the access,
rotating said wheel hub assembly away from said rigid arm thereby increasing the tension on said endless flexible drive belt or chain, and
then tightening said adjustment member at the desired tension of said endless flexible drive belt or chain.

* * * * *